US012613535B2

(12) United States Patent
Takemura et al.

(10) Patent No.: US 12,613,535 B2
(45) Date of Patent: Apr. 28, 2026

(54) FLIGHT CONTROL DEVICE AND NON-TRANSITORY COMPUTER READABLE MEDIUM STORING FLIGHT CONTROL PROGRAM

(71) Applicant: DENSO CORPORATION, Kariya-city (JP)

(72) Inventors: Yuichi Takemura, Kariya-city (JP); Shingo Nakata, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 18/628,983

(22) Filed: Apr. 8, 2024

(65) Prior Publication Data

US 2024/0255967 A1 Aug. 1, 2024

Related U.S. Application Data

(63) Continuation of application No. PCT/JP2022/039013, filed on Oct. 20, 2022.

(30) Foreign Application Priority Data

Nov. 5, 2021 (JP) ................................. 2021-181337

(51) Int. Cl.
| | |
|---|---|
| *G05D 1/654* | (2024.01) |
| *B64D 27/34* | (2024.01) |
| *B64D 31/09* | (2024.01) |
| *B64D 31/16* | (2024.01) |
| *G05D 1/85* | (2024.01) |

(52) U.S. Cl.
CPC ........... *G05D 1/6546* (2024.01); *B64D 27/34* (2024.01); *B64D 31/09* (2024.01); *B64D 31/16* (2024.01); *G05D 1/85* (2024.01)

(58) Field of Classification Search
CPC ........ B64D 31/09; B64D 31/16; B64D 27/31; B64D 27/357; B64D 45/00; G08G 5/21; G08G 5/58; B64C 29/0033; B64C 3/385; B64C 27/28; G05D 1/0816; G05D 1/6546; F16H 1/28; B64U 50/30; B64U 30/26
See application file for complete search history.

(56) References Cited

U.S. PATENT DOCUMENTS

| | | | | | |
|---|---|---|---|---|---|
| 11,592,841 | B2 * | 2/2023 | Clark | ...................... | B64D 45/00 |
| 2011/0024555 | A1 * | 2/2011 | Kuhn, Jr. | ............ | B64C 29/0033 |
| | | | | | 244/17.11 |
| 2012/0091257 | A1 * | 4/2012 | Wolff | ..................... | B64U 30/26 |
| | | | | | 244/12.4 |
| 2016/0144957 | A1 * | 5/2016 | Claridge | ................ | B64U 50/30 |
| | | | | | 244/6 |
| 2017/0345319 | A1 * | 11/2017 | Wang | ........................ | G08G 5/58 |
| 2019/0176979 | A1 | 6/2019 | Baba et al. | | |

(Continued)

FOREIGN PATENT DOCUMENTS

| | | | |
|---|---|---|---|
| CN | 111213106 | A | 5/2020 |
| JP | 6776083 | B2 | 10/2020 |

*Primary Examiner* — Yuri Kan

(74) *Attorney, Agent, or Firm* — Oliff PLC

(57) ABSTRACT

A technique controls a flight vehicle. In the technique, an operating mode for controlling the flight vehicle is set to one of normal modes when no abnormality has occurred in the flight vehicle. The operating mode is changed to one of fail-safe modes causing the flight vehicle to perform landing depending on current one of the normal modes when an abnormality has occurred in the flight vehicle.

17 Claims, 10 Drawing Sheets

(56) References Cited

U.S. PATENT DOCUMENTS

| | | | |
|---|---|---|---|
| 2019/0375495 A1* | 12/2019 | Pfammatter | ............ B64C 27/28 |
| 2020/0079520 A1* | 3/2020 | Demizu | ............... B64D 27/357 |
| 2020/0385110 A1* | 12/2020 | Groninga | ................. F16H 1/28 |
| 2021/0047022 A1* | 2/2021 | Robertson | ............... B64C 3/385 |
| 2021/0109547 A1* | 4/2021 | Clark | ................... G05D 1/0816 |
| 2021/0206483 A1* | 7/2021 | Lee | ..................... B64C 29/0033 |
| 2021/0264798 A1* | 8/2021 | B | ............................. G08G 5/21 |
| 2021/0309122 A1 | 10/2021 | Wake et al. | |
| 2021/0347473 A1* | 11/2021 | Dietrich | ................. B64D 27/31 |
| 2022/0017221 A1 | 1/2022 | Tsutsui et al. | |
| 2022/0089274 A1* | 3/2022 | Kirsch | .................. B64D 31/16 |

* cited by examiner

FLIGHT CONTROL DEVICE AND NON-TRANSITORY COMPUTER READABLE MEDIUM STORING FLIGHT CONTROL PROGRAM

CROSS REFERENCE TO RELATED APPLICATIONS

The present application is a continuation application of International Patent Application No. PCT/JP2022/039013 filed on Oct. 20, 2022, which designated the U.S. and claims the benefit of priority from Japanese Patent Application No. 2021-181337 filed on Nov. 5, 2021. The disclosures of all the above applications are incorporated herein.

TECHNICAL FIELD

The present disclosure relates to a technique to control a flight vehicle.

BACKGROUND

An unmanned flight vehicle executes an emergency evacuation operation such as emergency landing and emergency stop.

SUMMARY

According to at least one embodiment of the present disclosure, an operating mode for controlling a flight vehicle is set to one of normal modes when no abnormality has occurred in the flight vehicle. The operating mode is changed to one of fail-safe modes causing the flight vehicle to perform landing depending on current one of the normal modes when an abnormality has occurred in the flight vehicle.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
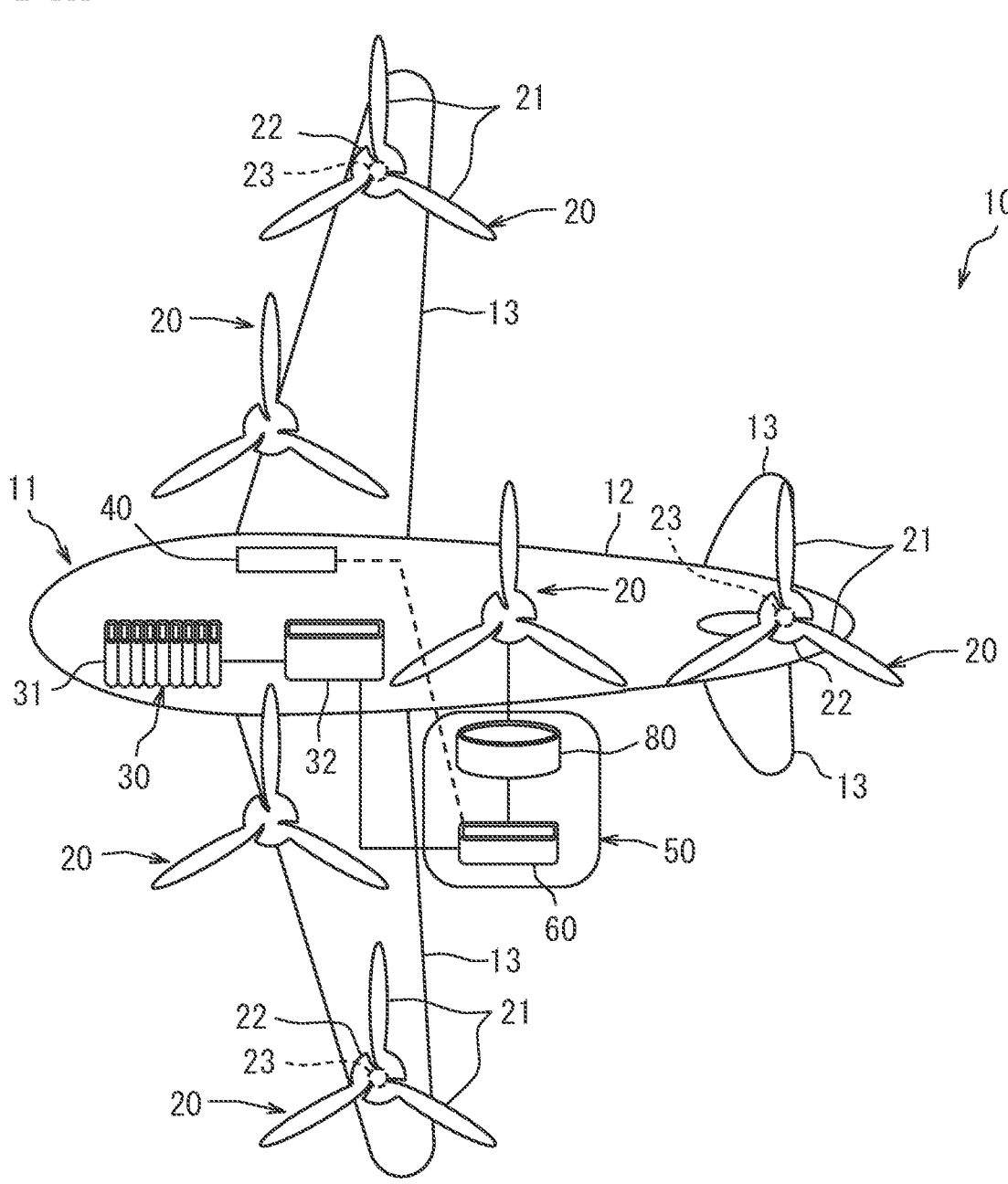
FIG. 1 is a diagram illustrating a configuration of an eVTOL according to a first embodiment.

To begin with, examples of relevant techniques will be described. An unmanned flight vehicle according to a comparative example flies with multiple rotary wings. The unmanned flight vehicle is equipped with an equipment such as a power distributor configured to distribute electric power and a flight controller configured to control flight of the unmanned flight vehicle. In this unmanned flight vehicle, an emergency evacuation operation such as emergency landing and emergency stop is performed depending on an equipment in which an abnormality has occurred.

However, in the unmanned flight vehicle, even if the emergency evacuation operation is performed depending on an equipment in which an abnormality has occurred, there is a concern that the emergency evacuation operation is not appropriate for a flight state of the flight vehicle.

In contrast, according to the present disclosure, safety can be improved when an abnormality occurs in a flight vehicle such as a vertical take-off and landing aircraft.

According to an aspect of the present disclosure, a flight control device is used for controlling a flight vehicle. The flight control device includes a normality setting unit configured to set an operating mode for controlling the flight vehicle to one of normal modes when no abnormality has occurred in the flight vehicle, and a fail safe unit configured to change the operating mode to one of fail-safe modes causing the flight vehicle to perform landing depending on current one of the normal modes when an abnormality has occurred in the flight vehicle.

According to the above aspect, the operating mode is changed to one of the fail-safe modes for landing the flight vehicle according to one of the normal modes set as the operating mode when an abnormality has occurred in the flight vehicle. With this configuration, in order to land the flight vehicle having an abnormality, a fail-safe mode suitable for an operating mode at the time of occurrence of the abnormality can be selected. Therefore, it is possible to enhance safety when an abnormality has occurred in the flight vehicle.

According to an aspect of the present disclosure, a control device is used for a vertical take-off and landing aircraft capable of performing vertical take-off and vertical landing. The control device includes a normality setting unit configured to set an operating mode for controlling the vertical take-off and landing aircraft to one of normal modes when no abnormality has occurred in the vertical take-off and landing aircraft, an abnormal-landing unit configured to change the operating mode to an abnormal-landing mode causing the vertical take-off and landing aircraft to perform vertical landing depending on current one of the normal modes when an abnormality has occurred in the vertical take-off and landing aircraft.

According to the above aspect, the operating mode is set to the abnormal-landing mode according to one of the normal modes set as the operating mode when an abnormality has occurred in the vertical take-off and landing aircraft. Since vertical landing of the vertical take-off and landing aircraft is performed in the abnormal-landing mode, flying of the vertical take-off and landing aircraft can be quickly terminated by the abnormal-landing mode. Therefore, it is possible to enhance safety when an abnormality has occurred in the vertical take-off and landing aircraft.

Hereinafter, multiple embodiments will be described with reference to the drawings. Elements corresponding to each other among the embodiments are assigned the same numeral and their descriptions may be omitted. When only a part of a component is described in an embodiment, the other part of the component can be relied on the component of a preceding embodiment. Furthermore, in addition to the combination of components explicitly described in each embodiment, it is also possible to combine components from different embodiments, as long as the combination poses no difficulty, even if not explicitly described.

First Embodiment

A flight system 30 illustrated in FIG. 1 is mounted on an eVTOL 10. The eVTOL 10 is an electric vertical take-off and landing aircraft. The electric vertical take-off and landing aircraft is an electric-type vertical take-off and landing aircraft, and can take off and land vertically. The eVTOL is an abbreviation for electric vertical take-off and landing aircraft. The eVTOL 10 is an electric-type aircraft flying in the atmosphere, and corresponds to a flight vehicle and an electric aircraft. The eVTOL 10 is a manned flight vehicle carrying an occupant. The occupant of the eVTOL 10 includes a pilot as an operator. The flight system 30 is a system driven to fly the eVTOL 10. The flight system 30 may be referred to as a propulsion system.

The eVTOL 10 includes an airframe 11 and a rotor 20. The airframe 11 includes an airframe body 12 and a wing 13. The airframe body 12 is a body of the airframe 11 and has, for example, a shape extending in a front-rear direction. The airframe body 12 has an occupant compartment for carrying an occupant. Multiple wings 13 extend from the airframe body 12 and are provided on the airframe body 12. The wings 13 are fixed wings. The multiple wings 13 include main wings, tail wings, and the like.

Multiple rotors 20 are provided on the airframe 11. The eVTOL 10 is provided with at least four rotors 20. The rotors 20 are provided on the airframe body 12 and the wings 13. The rotor 20 rotates about a rotor axis. The rotor axis is a rotation axis of the rotor 20 and coincides with a center line of the rotor 20.

The rotor 20 includes a blade 21, a rotor head 22, and a rotor shaft 23. Multiple blades 21 are arranged in a circumferential direction CD. The rotor head 22 couples the multiple blades 21. The blades 21 extend from the rotor head 22 in a radial direction RD. The blades 21 are vanes that rotate together with the rotor shaft 23. The rotor shaft 23 is a rotation shaft of the rotor 20 and extends from the rotor head 22 along the rotor axis.

The eVTOL 10 is a tiltrotor aircraft. In the eVTOL 10, the rotor 20 can be tilted. That is, a tilt angle of the rotor 20 is adjustable. For example, when the eVTOL 10 ascends, an orientation of the rotor 20 is set such that the rotor axis extends in an up-down direction. In this case, the rotor 20 functions as a lift rotor for generating lift on the eVTOL 10. That is, the rotor 20 can function as a rotary blade. The lift rotor also functions as a hovering rotor for causing the eVTOL 10 to hover. The lift rotor can also cause the eVTOL 10 to descend. The hovering rotor may be referred to as a hover rotor.

When the eVTOL 10 advances in a front direction, the orientation of the rotor 20 is set such that the rotor axis extends in the front-rear direction. In this case, the rotor 20 functions as a cruise rotor for generating thrust on the eVTOL 10. In the present embodiment, a front direction of a pilot is defined as a front direction of the eVTOL 10. A direction in which the eVTOL 10 advances in a horizontal direction may be defined as the front direction regardless of the front direction of the pilot. In this case, the eVTOL 10 normally advances in the front direction even when a traveling direction thereof changes.

Figure 2:
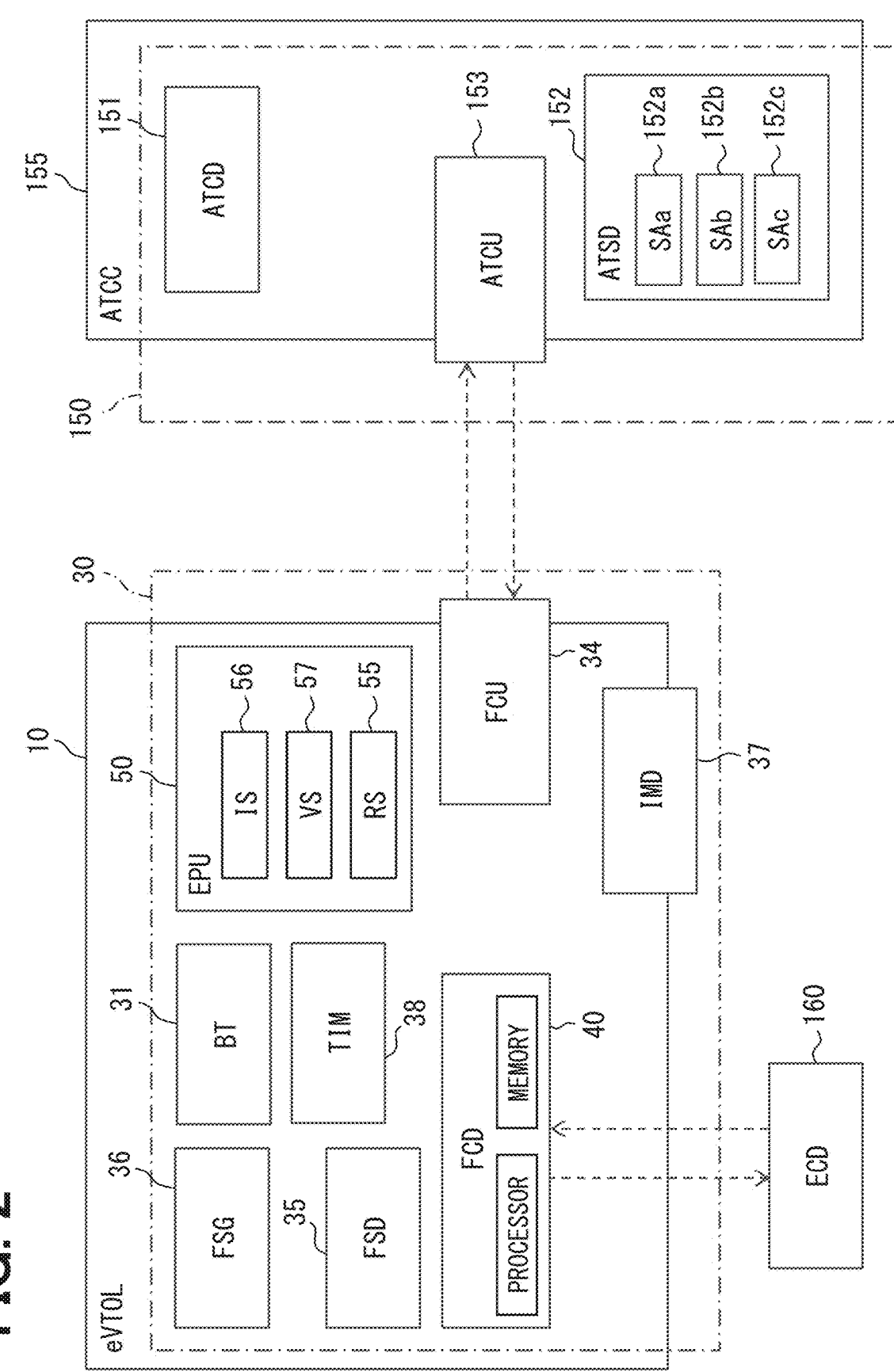
FIG. 2 is a block diagram illustrating an electrical configuration of a flight system and a management system.

As illustrated in FIG. 2, the eVTOL 10 includes a tilt mechanism 38. The tilt mechanism 38 includes a motor and the like, and is driven to adjust the tilt angle of the rotor 20.

The tilt mechanism 38 may be referred to as a tilt drive unit. For example, in the eVTOL 10, the wings 13 can be tilted relative to the airframe body 12. That is, the rotors 20 can be tilted together with the wings 13. In the eVTOL 10, the tilt angle of the rotor 20 is adjusted by adjusting an inclination angle of the wing 13 with respect to the airframe body 12. In the eVTOL 10, the tilt mechanism 38 adjusts the inclination angle of the wing 13.

In the eVTOL 10, the rotor 20 may be capable of tilting relative to the airframe 11. For example, the tilt angle of the rotor 20 may be adjusted by adjusting a relative inclination angle of the rotor 20 with respect to the wing 13.

As illustrated in FIGS. 1 and 2, the flight system 30 includes a battery 31, a distributor 32, a communication device 34, a storage device 35, a sensor group 36, an imaging device 37, the tilt mechanism 38, a flight control device 40, and an EPU 50. The EPU 50 includes a rotation sensor 55, a current sensor 56, and a voltage sensor 57. In FIG. 2, the battery 31 is denoted by BT, the communication device 34 by FCU, the storage device 35 by FSD, the sensor group 36 by FSG, the imaging device 37 by IMD, and the flight control device 40 by FCD. Further, the rotation sensor 55 is denoted by RS, the current sensor 56 by IS, and the voltage sensor 57 by VS. In FIG. 2, illustration of the distributor 32 is omitted.

The EPU 50 is a device that drives the rotor 20 to rotate, and corresponds to a drive device. The EPU is an abbreviation for electric propulsion unit. The EPU 50 may be referred to as an electric drive device. The EPU 50 is individually provided for each of the multiple rotors 20. The EPU 50 is aligned with the rotor 20 along the rotor axis. Each of the multiple EPUs 50 is fixed to the airframe 11. The EPU 50 rotatably supports the rotor 20. The EPU 50 is mechanically connected to the rotor shaft 23. The multiple EPUs 50 include at least one of the EPU 50 fixed to the airframe 11 in a state of protruding to the outside of the airframe 11 and the EPU 50 fixed to the airframe 11 in a state of being embedded inside the airframe 11.

The rotor 20 is fixed to the airframe 11 via the EPU 50. The EPU 50 is not tilted relative to the rotor 20. The EPU 50 may be tilted together with the rotor 20. When the tilt angle of the rotor 20 is adjusted, an orientation of the EPU 50 is set together with the rotor 20.

The EPU 50 includes a motor device 80 and an inverter device 60. The motor device 80 includes a motor and a motor housing. The motor is housed in the motor housing. The motor is a multi-phase AC motor, for example, a three-phase AC rotary electric machine. The motor functions as an electric motor that is a flight driving source of the eVTOL 10. The motor includes a rotor and a stator. The motor is driven by electric power of the battery 31. By driving of the motor, the EPU 50 drives the rotor 20 to rotate. As the motor, for example, a brushless motor is used. As the motor, an induction motor or a reluctance motor may be used.

The inverter device 60 includes an inverter and an inverter housing. The inverter is housed in the inverter housing. The inverter drives the motor by converting electric power to be supplied to the motor. The inverter may be referred to as a drive unit. The inverter converts the electric power to be supplied to the motor from a direct current to an alternating current. The inverter is an electric power conversion unit that converts the electric power. The inverter is a multi-phase electric power conversion unit, and performs electric power conversion for each of the multiple phases. The inverter is, for example, a three-phase inverter. The motor is driven according to a voltage and a current supplied from the inverter.

In the EPU 50, the driving of the motor is controlled according to detection results of the sensors 55 to 57 and the like. For example, the EPU 50 includes a drive control unit that controls driving of the motor. The drive control unit is electrically connected to the inverter and the sensors 55 to 57. The sensors 55 to 57 output the detection result to the drive control unit. The drive control unit performs motor control via the inverter. The drive control unit is electrically connected to the flight control device 40, and performs the motor control according to a signal from the flight control device 40. The flight control device 40 may directly control the motor and the like for the EPU 50.

The rotation sensor 55 is provided for the motor. The rotation sensor 55 detects the number of rotations of the motor. The rotation sensor 55 includes, for example, an encoder and a resolver. The current sensor 56 detects a current flowing through the motor as a motor current. The current sensor 56 detects a motor current for each of the multiple phases, for example. The voltage sensor 57 detects, as an inverter voltage, a voltage output from the inverter.

The battery 31 is electrically connected to the multiple EPUs 50. The battery 31 is an electric power supply unit that supplies electric power to the EPU 50, and corresponds to a power supply unit. The battery 31 is a DC voltage source that applies a DC voltage to the EPU 50. The battery 31 includes a rechargeable secondary battery. Examples of the secondary battery include a lithium ion battery and a nickel-hydrogen battery. In addition to or instead of the battery 31, a fuel cell, a generator, or the like may be used as the power supply unit. The battery 31 can store electric power and corresponds to a power storage device.

The distributor 32 is electrically connected to the battery 31 and the multiple EPUs 50. The distributor 32 distributes electric power from the battery 31 to the multiple EPUs 50. The battery 31 is electrically connected to the multiple EPUs 50 via the distributor 32. The battery 31 supplies the electric power to the EPU 50 via the distributor 32. When a voltage of the battery 31 is referred to as a high voltage, the high voltage is applied to the inverter described later in the EPU 50. The distributor 32 may be omitted as long as the electric power of the battery 31 is supplied to the multiple EPUs 50. As the configuration in which the distributor 32 may be omitted, for example, there is a configuration in which each of the multiple EPUs 50 is individually provided with the power supply unit.

The flight control device 40 illustrated in FIG. 2 is, for example, an ECU, and performs flight control for causing the eVTOL 10 to fly. The flight control device 40 is a control device that controls the flight system 30, and controls, for example, the EPU 50. The ECU is an abbreviation for electronic control unit. The flight control device 40 is mainly implemented by a microcomputer including, for example, a processor, a memory, an I/O, and a bus that connects these components. The microcomputer may be referred to as a micro computer. The memory is a non-transitory tangible storage medium that non-temporarily stores computer readable programs and data. The non-transitory tangible storage medium is implemented by a semiconductor memory, a magnetic disk, or the like.

The flight control device 40 is electrically connected to the storage device 35, the EPU 50, and the tilt mechanism 38. The flight control device 40 executes a control program stored in at least one of the memory and the storage device 35 to execute various types of processing related to the flight control. The flight control device 40 performs the flight control according to detection results of various sensors and the like. The flight control includes drive control for driving the EPU 50, tilt angle control for controlling the tilt mechanism 38 to adjust the tilt angle, and the like. The storage device 35 stores information related to the flight control such as a control program. The various sensors include sensors of the sensor group 36, the rotation sensor 55, the current sensor 56, and the voltage sensor 57. The storage device 35 may be provided in the flight control device 40.

The flight control device 40 is electrically connected to the communication device 34, the sensor group 36, and the imaging device 37. The communication device 34 can communicate with an external device different from the eVTOL 10. The communication device 34 can output and receive information to and from the flight control device 40.

The sensor group 36 includes multiple sensors. For example, the sensor group 36 includes a sensor configured to detect an outside air temperature, a sensor configured to detect a flight speed of the eVTOL 10, and a sensor configured to detect an altitude of the eVTOL 10. Each sensor of the sensor group 36 outputs a detection result to the flight control device 40.

The imaging device 37 can capture images of an inner portion and an outer portion of the eVTOL 10. The imaging device 37 can capture at least one of a moving image and a still image. The imaging device 37 is, for example, a camera. The imaging device 37 outputs information related to the captured image to the flight control device 40.

The eVTOL 10 is managed by a management system 150. The management system 150 is provided in a management center 155. The management center 155 is a facility where the eVTOL 10 can be managed using the management system 150. The management center 155 may be referred to as a control center and an aircraft control center.

The management system 150 can control the eVTOL 10. For example, the management system 150 can manage and restrict flight of the eVTOL 10. The management system 150 may be capable of controlling the flight of the eVTOL 10. The management system 150 includes a management device 151, a storage device 152, and a communication device 153. Similarly to the flight control device 40, the management device 151 is mainly implemented by a micro computer. The management device 151 is a control device that controls the management system 150. The management device 151 is electrically connected to the storage device 152 and the communication device 153.

The storage device 152 stores information related to the eVTOL 10. The storage device 152 includes multiple storage areas. The multiple storage areas include, for example, a first storage area 152a, a second storage area 152b, and a third storage area 152c. The storage areas 152a, 152b, and 152c store information related to the eVTOL 10.

For example, a database of a landing field is stored in the first storage area 152a. The landing field is a place where the eVTOL 10 can land. The landing field is also a place where the eVTOL 10 can take off and land, and may be referred to as a take-off and landing field or a departure and arrival field. The landing field database includes information related to multiple landing fields. The information related to a landing field includes, for example, a position and a size of the landing field. In the storage device 152, the latest information on a landing field is stored in the first storage area 152a or the like. The latest information on a landing field includes information related to a use status of the landing field by a flight vehicle or the like, information related to whether the eVTOL 10 can use the landing field, and the like. The landing field is a place where the flight vehicle can take off and land, and may be referred to as a take-off and landing field or an airfield. The landing field is a place serving as a departure place and a destination of the eVTOL 10.

For example, weather information is stored in the second storage area 152*b*. The weather information related to weather includes weather of multiple landing fields, weather of a flight route for flying to a landing field, and the like. In the third storage area 152*c*, for example, restricted-airspace information is stored. The restricted-airspace information is information related to an airspace and a region where the flight of the eVTOL 10 is restricted.

The communication device 153 can wirelessly communicate with the communication device 34 of in the eVTOL 10. The communication device 153 can output and receive information to and from the management device 151. Information can be exchanged between the management center 155 and the eVTOL 10 by the communication devices 153 and 34. The management device 151 and the flight control device 40 can transmit and receive various types of information via the communication devices 153 and 34.

The various types of information transmitted from the eVTOL 10 to the management center 155 include flight information. The flight information includes information indicating a mode of abnormality when an abnormality occurs in the eVTOL 10 and information indicating a range in which the eVTOL 10 can fly. In addition, the flight information includes information for making a request to the management center 155 for emergency landing of the eVTOL 10 and information for requesting rescue of an occupant aboard the eVTOL 10. The various types of information received by the eVTOL 10 from the management center 155 include management information. The management information includes information indicating a landing field where the eVTOL 10 can land.

The flight control device 40 can perform abnormality diagnosis for diagnosing an abnormality of the eVTOL 10. The flight control device 40 determines whether an abnormality has occurred in the eVTOL 10, as an abnormality diagnosis of the eVTOL 10. The abnormality diagnosis performed by the flight control device 40 is performed according to an operating state of the eVTOL 10. For example, when the eVTOL 10 has not yet taken off, the flight control device 40 performs the abnormality diagnosis based on contents corresponding to the fact that the eVTOL 10 has not yet taken off.

A diagnostic device 160 is electrically detachably connected to the flight control device 40. The diagnostic device 160 performs inspection processing for confirming that the eVTOL 10 is normal. For example, when the flight control device 40 diagnoses the occurrence of an abnormality in the eVTOL 10 and the abnormality in the eVTOL 10 is eliminated by repair or the like by a worker, the diagnostic device 160 performs the inspection processing. The diagnostic device 160 is a device for diagnosing, by the inspection processing, that the eVTOL 10 is normal. The diagnostic device 160 is temporarily connected to the flight control device 40 to perform the inspection processing. Similarly to the flight control device 40, the diagnostic device 160 is mainly implemented by a micro computer. The flight control device 40 and the diagnostic device 160 exchange information necessary for the inspection processing, information necessary after elimination of the abnormality, and the like. The diagnostic device 160 may exchange information with the flight control device 40 by wireless communication. The diagnostic device 160 may be referred to as an external controller.

In FIG. 2, the management device 151 is denoted by ATCD, the storage device 152 by ATSD, the communication device 153 by ATCU, and the management center 155 by ATCC. The first storage area 152*a* is denoted by SAa, the second storage area 152*b* by SAb, and the third storage area 152*c* by SAc. Further, the diagnostic device 160 is denoted by ECD.

The flight control device 40 performs flight control processing for causing the eVTOL 10 to fly. The flight control device 40 controls driving and rotation of the rotor 20 via, for example, the EPU 50 in the flight control processing. The eVTOL 10 corresponds to a vertical take-off and landing aircraft, and the flight control device 40 corresponds to a control device of the vertical take-off and landing aircraft. The flight control device 40 may be referred to as a flight controller and an internal controller.

The flight control processing will be described with reference to flowcharts of FIGS. 3 to 8. The flight control device 40 repeatedly executes the flight control processing at a predetermined control cycle. The flight control device 40 has a function of executing processing of each step of the flight control processing.

Figure 3:
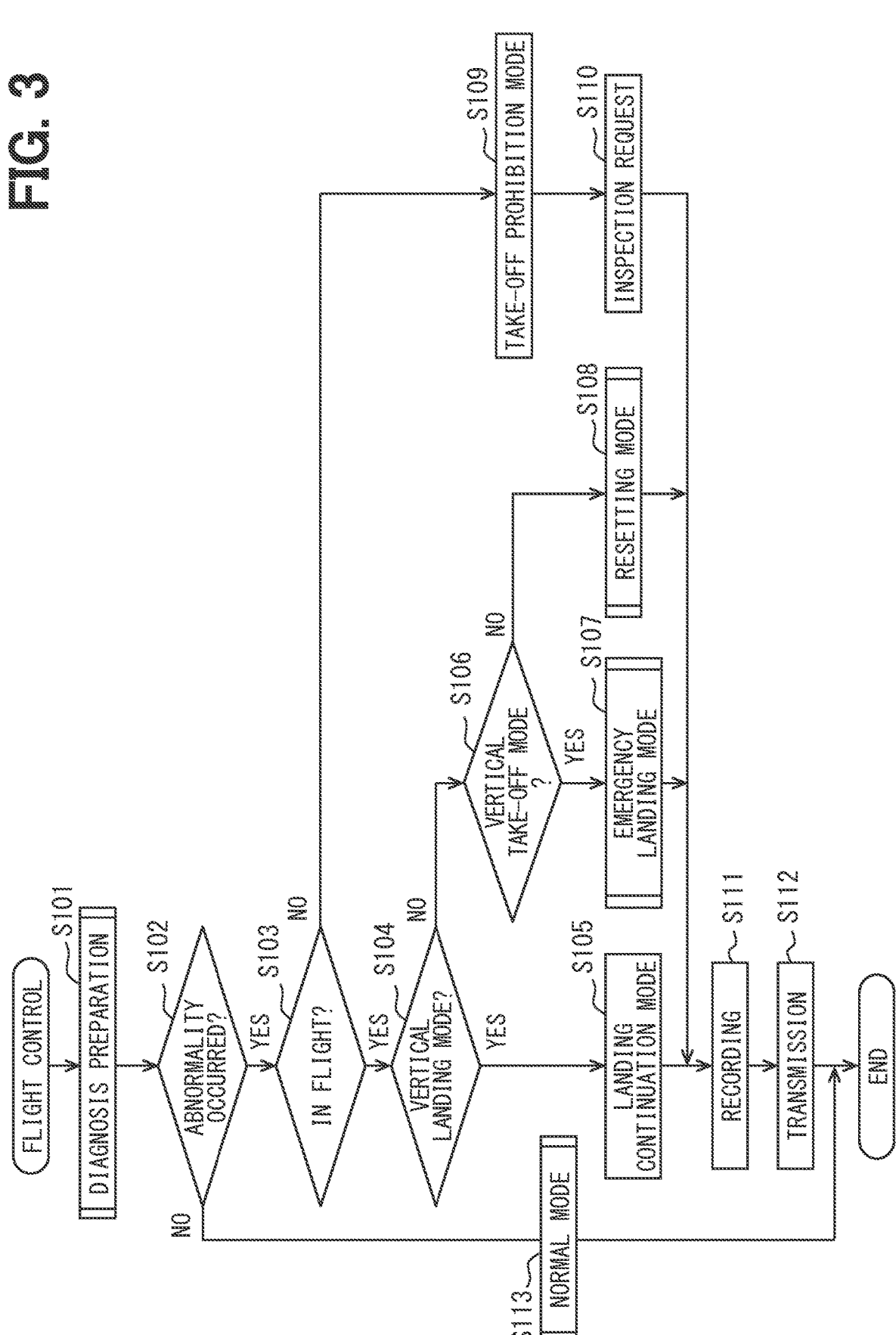
FIG. 3 is a flowchart illustrating a procedure of flight control processing.

The flight control device 40 performs diagnosis preparation in step S101 shown in FIG. 3. The flight control device 40 performs abnormality diagnosis of the eVTOL 10 under a predetermined diagnostic condition. The diagnosis preparation is processing for setting a diagnostic condition, as preparation for performing the abnormality diagnosis of the eVTOL 10. In the diagnosis preparation, the flight control device 40 sets a diagnostic condition according to a current operating mode. The function of the flight control device 40 executing the processing of step S101 corresponds to a condition setting unit. Details of S101 will be described later.

The flight control device 40 performs abnormality diagnosis in step S102. The flight control device 40 performs the abnormality diagnosis according to the current operating mode. For example, the flight control device 40 performs the abnormality diagnosis under a diagnostic condition set according to the operating mode. The operating mode is a mode set for the flight control device 40 to operate the eVTOL 10. The flight control device 40 operates the eVTOL 10 in accordance with the operating mode of each time. An operating state of the eVTOL 10 operated by the flight control device 40 changes according to the operating mode. A flight mode of the eVTOL 10 changes according to the operating mode. The operating mode can cause the flight mode of the eVTOL 10 to change.

The flight control device 40 determines whether an abnormality has occurred in the eVTOL 10, as the abnormality diagnosis. The function of the flight control device 40 executing the processing of step S102 corresponds to an abnormality diagnosis unit. When it is diagnosed that an abnormality has occurred, the flight control device 40 proceeds to step S103. On the other hand, when it is diagnosed that no abnormality has occurred, the flight control device 40 proceeds to step S113.

The flight control device 40 performs normal mode processing in step S113. The flight control device 40 sets the operating mode to a normal mode in the normal mode processing. The flight control device 40 operates the eVTOL 10 according to contents of the operating mode. That is, the flight control device 40 performs flight control according to the contents of the operating mode. There are multiple modes that can be set as the operating mode. These modes include the normal mode and a fail-safe mode. The normal mode is a mode for flying the eVTOL 10 in a normal state in which no abnormality has occurred. The normal mode includes, for example, a take-off preparation mode, a vertical take-off mode, a cruise mode, a hovering mode, and a vertical landing mode. The function of the flight control device 40 executing the processing of step S113 corresponds to a normality setting unit.

In a state where the operating mode is set to the normal mode, the flight control device 40 can automatically execute at least a part of the processing to be performed in the normal mode. For example, it is automatically included that the flight control device 40 performs predetermined processing in a state where no operation of a pilot is performed. When the operating mode is set to the normal mode, the flight control device 40 automatically performs at least a part of the processing for causing the eVTOL 10 to fly. For example, in a state where the operating mode is set to the vertical take-off mode, at least a part of the processing for causing the eVTOL 10 to vertically take off is automatically performed by the flight control device 40. Similarly, in each of the take-off preparation mode, the cruise mode, the hovering mode, and the vertical landing mode, at least a part of the processing to be performed in the corresponding mode is automatically performed by the flight control device 40.

Figure 8:
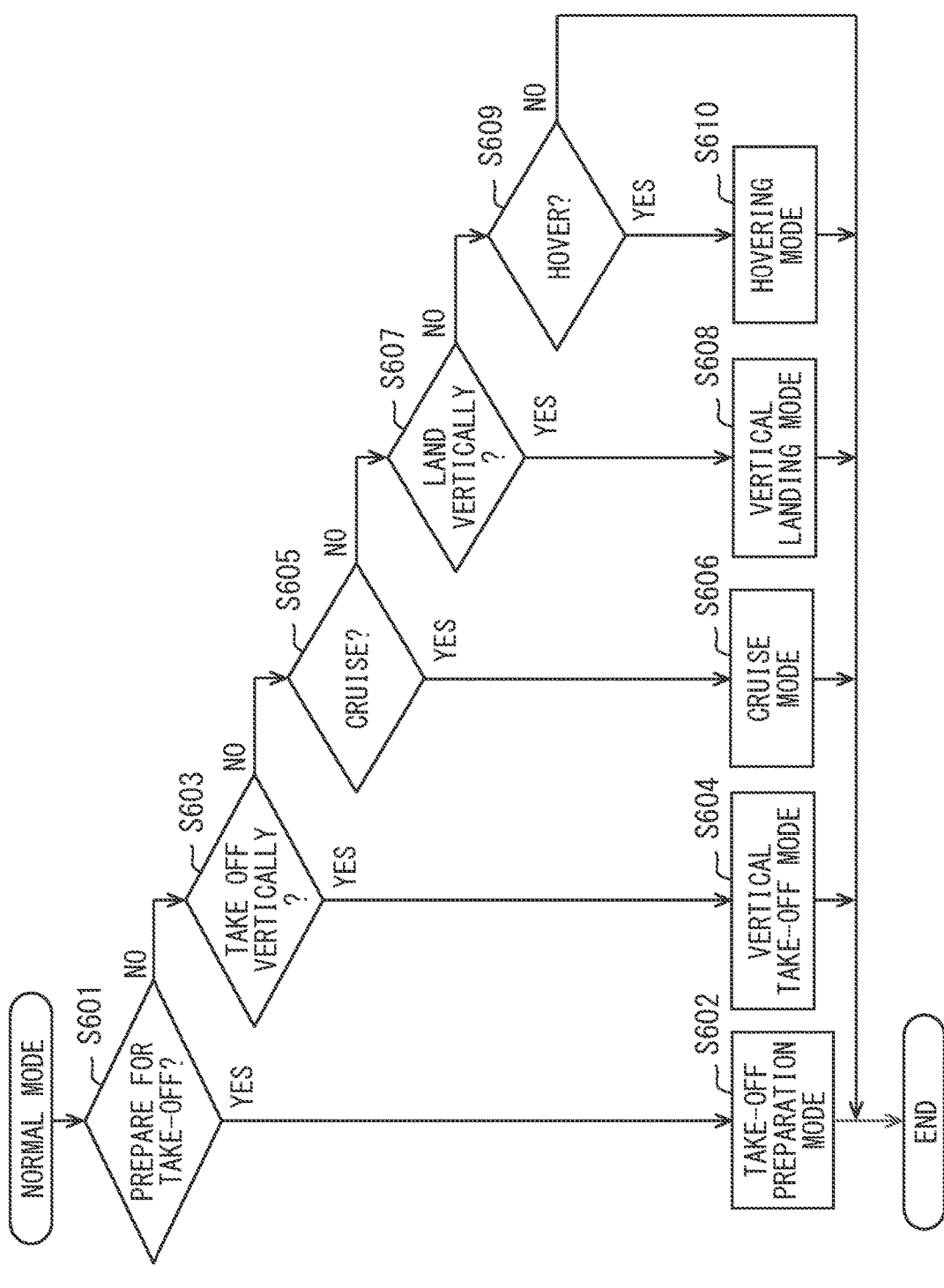
FIG. 8 is a flowchart illustrating a procedure of normal mode processing.

The normal mode processing will be described with reference to the flowchart of FIG. 8. In step S601 of the normal mode processing, the flight control device 40 performs take-off preparation determination as to whether to perform take-off preparation. The take-off preparation determination is performed when the eVTOL 10 is on the ground. In the present embodiment, a state where the eVTOL 10 has landed is referred to as being "on the ground". When the eVTOL 10 is on the ground, the eVTOL 10 is present on the ground without flying. The case where the eVTOL 10 is on the ground includes, for example, a state of the eVTOL 10 before taking off and a state of the eVTOL 10 after landing. For the flight vehicle, being on the ground corresponds to a landed state.

In the take-off preparation determination, for example, when an operation for performing the take-off preparation of the eVTOL 10 is performed by a pilot, the flight control device 40 determines to perform the take-off preparation. Examples of the operation for performing the take-off preparation of the eVTOL 10 include an on operation of turning on a power switch of the eVTOL 10. The operation of a pilot corresponds to an instruction of the pilot. Examples of the operation of a pilot include a physical operation by hands, feet, or the like, and an operation based on voice.

When performing the take-off preparation of the eVTOL 10, the flight control device 40 proceeds to step S602 and sets the operating mode to the take-off preparation mode. The take-off preparation mode is a mode for preparing for the eVTOL 10 to take off. When the operating mode is the take-off preparation mode, the flight control device 40 performs the take-off preparation necessary for the eVTOL 10 to take off. In this case, for example, in preparation for the eVTOL 10 to take off vertically, the flight control device 40 adjusts the tilt angle such that the rotor 20 functions as a lift rotor. The flight control device 40 drives the tilt mechanism 38 to adjust the tilt angle.

When a negative determination is made in step S601, the flight control device 40 proceeds to step S603 and determines whether the eVTOL 10 takes off vertically. For example, when an operation for causing the eVTOL 10 to take off vertically is performed by the pilot in a state where the take-off preparation of the eVTOL 10 is completed, the flight control device 40 determines to cause the eVTOL 10 to take off vertically.

When the eVTOL 10 is caused to take off vertically, the flight control device 40 proceeds to step S604 and sets the operating mode to the vertical take-off mode. The vertical take-off mode is a mode for causing the eVTOL 10 to take off vertically. When the operating mode is the vertical take-off mode, the flight control device 40 drives the rotor 20 to rotate such that the eVTOL 10 takes off vertically. The flight control device 40 drives the rotor 20 to rotate which functions as a lift rotor in the vertical take-off mode. In the vertical take-off mode, the eVTOL 10 ascends in a vertical direction without sliding, thereby taking off vertically from a take-off point.

When a negative determination is made in step S603, the flight control device 40 proceeds to step S605 and determines whether to cause the eVTOL 10 to cruise. For example, when an operation for causing the eVTOL 10 to cruise is performed by the pilot in a state where the vertical take-off of the eVTOL 10 is completed, the flight control device 40 determines to cause the eVTOL 10 to cruise. In the present embodiment, the flight of the eVTOL 10 in a manner of moving in the horizontal direction is referred to as cruising.

When causing the eVTOL 10 to cruise, the flight control device 40 proceeds to step S606 and sets the operating mode to the cruise mode. The cruise mode is a mode for causing the eVTOL 10 to fly by cruising. When the operating mode is the cruise mode, the flight control device 40 drives the rotor 20 to rotate such that the eVTOL 10 advances in the front direction in horizontal flight. The flight control device 40 drives the rotor 20 to rotate which functions as a cruise rotor. In the cruise mode, for example, the eVTOL 10 performs cruising so as to maintain a predetermined cruising altitude and a predetermined cruising speed on a predetermined flight route. The flight route is a route for the eVTOL 10 to fly from the departure place to the destination. The flight route includes at least one of a course and a route taken for the eVTOL 10.

When a negative determination is made in step S605, the flight control device 40 proceeds to step S607 and determines whether to cause the eVTOL 10 to vertically land. For example, when the cruising of the eVTOL 10 is completed, the eVTOL 10 reaches above the destination, and an operation for vertically landing the eVTOL 10 is performed by the pilot, the flight control device 40 determines to vertically land the eVTOL 10.

When vertically landing the eVTOL 10, the flight control device 40 proceeds to step S608 and sets the operating mode to the vertical landing mode. The vertical landing mode is a mode for vertically landing the eVTOL 10. When the operating mode is the vertical landing mode, the flight control device 40 drives the rotor 20 to rotate such that the eVTOL 10 lands vertically. The flight control device 40 drives the rotor 20 to rotate which functions as a lift rotor in the vertical landing mode. In the vertical landing mode, the eVTOL 10 descends in the vertical direction to vertically land on a landing point without sliding. The flight control device 40 may cancel the vertical landing mode after the vertical landing of the eVTOL 10 is completed.

When a negative determination is made in step S607, the flight control device 40 proceeds to step S609 and determines whether to cause the eVTOL 10 to hover. For example, when an operation for causing the eVTOL 10 to hover is performed by the pilot in a state where the eVTOL 10 is cruising, the flight control device 40 determines to cause the eVTOL 10 to hover.

When causing the eVTOL 10 to hover, the flight control device 40 proceeds to step S610 and sets the operating mode to the hovering mode. The hovering mode is a mode for causing the eVTOL 10 to hover. When the operating mode is the hovering mode, the flight control device 40 drives the rotor 20 to rotate such that the eVTOL 10 flies as if the eVTOL 10 was stopped in the air. The flight control device 40 drives the rotor 20 to rotate which functions as a hovering rotor. In the hovering mode, the eVTOL 10 is in a floating state so as to maintain, for example, a predetermined altitude and a predetermined position.

The flight control device 40 can perform mode switching of switching between the operating modes. For example, the flight control device 40 can perform mode switching from the vertical take-off mode to the cruise mode, mode switching from one of the cruise mode and the hovering mode to the other, and mode switching from the cruise mode to the vertical landing mode.

The operating mode may include, as a normal mode, a normal switching mode for performing mode switching. For example, the flight control device 40 performs mode switching when the operating mode is set to the normal switching mode. In other words, when the flight control device 40 performs mode switching, the operating mode is set to the normal switching mode.

When performing mode switching from the vertical take-off mode to the cruise mode, the flight control device 40 changes the eVTOL 10 from a state in which vertical take-off is enabled to a state in which cruising is enabled. For example, the flight control device 40 drives the tilt mechanism 38 such that the rotor 20 changes from the lift rotor to the cruise rotor.

In addition, when performing mode switching from one of the cruise mode and the hovering mode to the other, the flight control device 40 changes the eVTOL 10 from one of the state in which cruising is enabled and a state in which hovering is enabled to the other. For example, the flight control device 40 drives the tilt mechanism 38 such that the rotor 20 changes from one of the cruise rotor and the hovering rotor to the other.

Further, when performing mode switching from the cruise mode to the vertical landing mode, the flight control device 40 changes the eVTOL 10 from the state in which cruising is enabled to a state in which vertical landing is enabled. For example, the flight control device 40 drives the tilt mechanism 38 such that the rotor 20 changes from the cruise rotor to the lift rotor.

Figure 4:
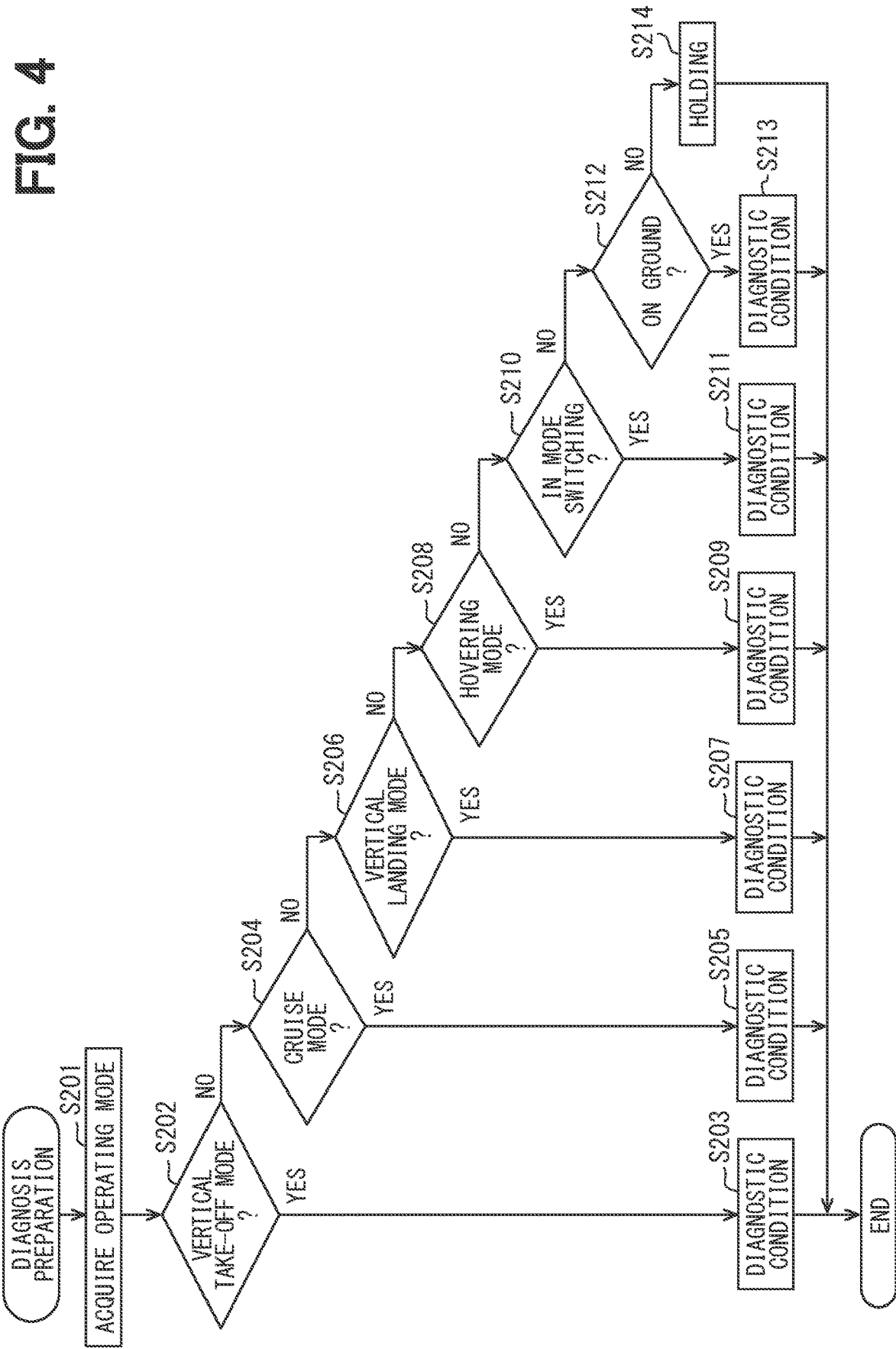
FIG. 4 is a flowchart illustrating a procedure of diagnosis preparation processing.

Next, diagnosis preparation processing of step S101 will be described with reference to the flowchart of FIG. 4. The eVTOL 10 includes multiple devices and multiple pieces of equipment, and flies by driving the devices and equipment so as to be selectively used according to the operating mode. Therefore, depending on which mode is the operating mode when an abnormality has occurred in any of the devices and the equipment, a case where the flight of the eVTOL 10 is likely to be hindered and a case where the flight of the eVTOL 10 is unlikely to be hindered are assumed. Therefore, in the diagnosis preparation processing, according to the operating mode, the flight control device 40 sets a diagnostic condition for diagnosing an abnormality of the eVTOL 10. The diagnostic condition is set according to which of the multiple normal modes the operating mode is set to.

Examples of the diagnostic condition include, for example, a diagnostic cycle, an object to be diagnosed, and a diagnostic criterion. The diagnostic cycle is, for example, a cycle for performing the abnormality diagnosis in step S102. The object to be diagnosed is a device and equipment to be subjected to abnormality diagnosis in the eVTOL 10.

Examples of the object to be diagnosed include the EPU 50 and the tilt mechanism 38. The diagnostic criterion is a determination criterion for determining whether an abnormality has occurred in the eVTOL 10 with respect to various types of information acquired by the flight control device 40. The determination criterion is set as, for example, a normal range indicating that the eVTOL 10 is normal. The normal range may be referred to as an allowable range.

In the present embodiment, an abnormality that occurs in the eVTOL 10 is assumed to be an abnormality that allows the eVTOL 10 to continue to fly to the extent that the eVTOL 10 can land. For example, in the eVTOL 10 on which at least four rotors 20 are mounted, an abnormality is assumed that allows to drive at least two rotors 20 to rotate. When the abnormality has occurred, the eVTOL 10 can land by driving at least two rotors 20 to rotate. For example, when a failure of the EPU 50 has occurred due to an abnormality of the eVTOL 10, driving of the failed EPU 50 is stopped, and the rotor 20 is driven to rotate by the normal EPU 50.

In step S201 of the diagnosis preparation processing, the flight control device 40 acquires the current operating mode. In the description of the diagnosis preparation processing, the current operating mode may be simply referred to as the operating mode. In step S202, the flight control device 40 determines whether the operating mode is the vertical take-off mode. When the operating mode is the vertical take-off mode, the flight control device 40 proceeds to step S203 and sets the diagnostic condition for the vertical take-off mode. The flight control device 40 sets a diagnostic cycle, an object to be diagnosed, and a diagnostic criterion as diagnostic conditions for the vertical take-off mode. The function of the flight control device 40 executing the processing of step S203 corresponds to a vertical take-off cycle unit.

Regarding the diagnostic cycle in the vertical take-off mode, the flight control device 40 sets a predetermined vertical take-off cycle as the diagnostic cycle. The vertical take-off cycle is, for example, substantially the same cycle as the control cycle of the flight control processing. When the operating mode is the vertical take-off mode, the flight control device 40 performs the abnormality diagnosis of step S102 each time the flight control processing is performed.

Regarding the object to be diagnosed in the vertical take-off mode, the flight control device 40 sets a device and equipment driven for the vertical take-off of the eVTOL 10 as the object to be diagnosed. The object to be diagnosed includes a device and equipment driven by the flight control device 40 in the vertical take-off mode. The object to be diagnosed in the vertical take-off mode includes, for example, the EPU 50 and the tilt mechanism 38. The object to be diagnosed in the vertical take-off mode includes a device and equipment that are driven after the eVTOL 10 vertically takes off until the eVTOL 10 arrives at the destination. The object to be diagnosed includes a device and equipment that are driven by the flight control device 40 in the vertical take-off mode, the cruise mode, the vertical landing mode, the hovering mode, and the mode switching.

Regarding the diagnostic criterion in the vertical take-off mode, the flight control device 40 sets, as the diagnostic criterion, a normal range of each of various types of information acquired for the vertical take-off of the eVTOL 10. The various types of information for which the diagnostic criteria are set include various types of information acquired by the flight control device 40 in the vertical take-off mode. The various types of information for which the diagnostic criteria are set in the vertical take-off mode include various types of information that are acquired from when the eVTOL 10 vertically takes off to when the eVTOL 10 arrives at the destination. For example, the various types of information includes various types of information acquired by the flight control device 40 in each of the vertical take-off mode, the cruise mode, the vertical landing mode, the hovering mode, and the mode switching.

When a negative determination is made in step S202, the flight control device 40 proceeds to step S204 and determines whether the operating mode is the cruise mode. When the operating mode is the cruise mode, the flight control device 40 proceeds to step S205 and sets the diagnostic condition for the cruise mode. The flight control device 40 sets a diagnostic cycle, an object to be diagnosed, and a diagnostic criterion as diagnostic conditions for the cruise mode. The function of the flight control device 40 executing the processing of step S205 corresponds to a cruise cycle unit.

The flight control device 40 sets the diagnostic cycle for the cruise mode according to the flight speed of the eVTOL 10. The flight control device 40 acquires the flight speed of the eVTOL 10 using the detection results from the sensor group 36. The flight control device 40 determines whether the flight speed of the eVTOL 10 is larger than a predetermined determination speed. When the flight speed is larger than the determination speed, the flight control device 40 sets a predetermined cruise cycle as the diagnostic cycle. A determination value is, for example, a predetermined cruising speed set for the cruise mode. The cruise cycle is a cycle longer than, for example, the vertical take-off cycle. The cruise cycle is a cycle longer than the control cycle of the flight control processing. For example, when the operating mode is the cruise mode, the flight control device 40 performs the abnormality diagnosis of step S102 once every time the flight control processing is performed predetermined multiple times.

On the other hand, when the flight speed is not larger than the determination speed, the flight control device 40 sets the diagnostic cycle to a cycle shorter than the cruise cycle. In this case, the flight control device 40 sets, for example, the diagnostic cycle to be substantially the same as the vertical take-off cycle. When the operating mode is the cruise mode and the flight speed is not larger than the determination speed, the flight control device 40 performs the abnormality diagnosis of step S102 each time the flight control processing is performed.

Regarding the object to be diagnosed in the cruise mode, the flight control device 40 sets a device and equipment driven for cruising of the eVTOL 10 as the object to be diagnosed. The object to be diagnosed includes a device and equipment driven by the flight control device 40 in the cruise mode. The object to be diagnosed in the cruise mode includes, for example, the EPU 50 and the tilt mechanism 38. The object to be diagnosed in the cruise mode includes a device and equipment that are driven until the eVTOL 10 arrives at the destination by cruising or the like. The object to be diagnosed includes a device and equipment that are driven by the flight control device 40 in the cruise mode, the vertical landing mode, the hovering mode, and the mode switching.

Regarding the diagnostic criterion in the cruise mode, the flight control device 40 sets, as the diagnostic criterion, a normal range of each of various types of information acquired for cruising of the eVTOL 10. The various types of information for which the diagnostic criteria are set include various types of information acquired by the flight control device 40 in the cruise mode. The various types of information for which the diagnostic criterion is set in the cruise mode include various types of information that are acquired from when the eVTOL 10 cruises to when the eVTOL 10 arrives at the destination. For example, the various types of information include various types of information acquired by the flight control device 40 in each of the cruise mode, the vertical landing mode, the hovering mode, and the mode switching, excluding the vertical take-off mode.

When a negative determination is made in step S204, the flight control device 40 proceeds to step S206 and determines whether the operating mode is the vertical landing mode. When the operating mode is the vertical landing mode, the flight control device 40 proceeds to step S207 and sets the diagnostic condition for the vertical landing mode. The flight control device 40 sets a diagnostic cycle, an object to be diagnosed, and a diagnostic criterion as diagnostic conditions for the vertical landing mode.

Regarding the diagnostic cycle in the vertical landing mode, the flight control device 40 sets a predetermined vertical landing cycle as the diagnostic cycle. The vertical landing cycle is, for example, a cycle shorter than the cruise cycle. The vertical landing cycle is substantially the same as the vertical take-off cycle. For example, when the operating mode is the vertical landing mode, the flight control device 40 performs the abnormality diagnosis of step S102 each time the flight control processing is performed.

Regarding the object to be diagnosed in the vertical landing mode, the flight control device 40 sets a device and equipment driven for the vertical landing of the eVTOL 10 as the object to be diagnosed. The object to be diagnosed includes a device and equipment driven by the flight control device 40 in the vertical landing mode. The object to be diagnosed includes, for example, the EPU 50, and does not include the tilt mechanism 38. This is because it is not necessary to drive the tilt mechanism 38 after the eVTOL 10 vertically lands. In the eVTOL 10, even if an abnormality of the tilt mechanism 38 is not found during the vertical landing, it is possible to find the abnormality of the tilt mechanism 38 after the vertical landing.

Regarding the diagnostic criterion in the vertical landing mode, the flight control device 40 sets, as the diagnostic criterion, a normal range of each of various types of information acquired for the vertical landing of the eVTOL 10. The various types of information for which the diagnostic criteria are set include various types of information acquired by the flight control device 40 in the vertical landing mode.

When a negative determination is made in step S206, the flight control device 40 proceeds to step S208 and determines whether the operating mode is the hovering mode. When the operating mode is the hovering mode, the flight control device 40 proceeds to step S209 and sets the diagnostic condition for the hovering mode. The flight control device 40 sets a diagnostic cycle, an object to be diagnosed, and a diagnostic criterion as diagnostic conditions for the hovering mode.

Regarding the diagnostic cycle in the hovering mode, the flight control device 40 sets a predetermined hovering cycle as the diagnostic cycle. The hovering cycle is, for example, a cycle shorter than the cruise cycle. The hovering cycle is, for example, substantially the same as the vertical take-off cycle. For example, when the operating mode is the hovering mode, the flight control device 40 performs the abnormality diagnosis of step S102 each time the flight control processing is performed.

Regarding the object to be diagnosed in the hovering mode, the flight control device 40 sets a device and equipment driven for the hovering of the eVTOL 10 as the object to be diagnosed. The object to be diagnosed includes a device and equipment driven by the flight control device 40 in the hovering mode. The object to be diagnosed in the hovering mode includes, for example, the EPU 50 and the tilt mechanism 38. The object to be diagnosed in the hovering mode includes a device and equipment that are driven after the eVTOL 10 hovers until the eVTOL 10 arrives at the destination. Similarly to the case of the cruise mode, the object to be diagnosed includes a device and equipment that are driven by the flight control device 40 in the cruise mode, the vertical landing mode, the hovering mode, and the mode switching.

Regarding the diagnostic criterion in the hovering mode, the flight control device 40 sets, as the diagnostic criterion, a normal range of each of various types of information acquired for the hovering of the eVTOL 10. The various types of information for which the diagnostic criteria are set include various types of information acquired by the flight control device 40 in the hovering mode. The various types of information for which the diagnostic criteria are set in the hovering mode include various types of information acquired from when the eVTOL 10 hovers to when the eVTOL 10 arrives at the destination. For example, similarly to the case of the cruise mode, the various types of information include various types of information acquired by the flight control device 40 in each of the cruise mode, the vertical landing mode, the hovering mode, and the mode switching, excluding the vertical take-off mode.

When a negative determination is made in step S208, the flight control device 40 proceeds to step S210 and determines whether the mode switching is being performed. When the mode switching is being performed, the flight control device 40 assumes that the mode switching is being performed, proceeds to step S211, and sets the diagnostic condition for the mode switching. The flight control device 40 sets a diagnostic cycle, an object to be diagnosed, and a diagnostic criterion as diagnostic conditions for the mode switching.

Regarding the diagnostic cycle in the mode switching, the flight control device 40 sets a predetermined mode switching cycle as the diagnostic cycle. The mode switching cycle is, for example, a cycle shorter than the cruise cycle. The mode switching cycle is substantially the same as the vertical take-off cycle. For example, in the mode switching, the flight control device 40 performs the abnormality diagnosis of step S102 each time the flight control processing is performed.

Regarding the object to be diagnosed in the mode switching, the flight control device 40 sets a device and equipment driven in the mode switching in the eVTOL 10 as the object to be diagnosed. The object to be diagnosed includes at least the tilt mechanism 38 of the EPU 50 and the tilt mechanism 38. The object to be diagnosed in the mode switching includes a device and equipment that are driven from the mode switching after the eVTOL 10 vertically takes off until the eVTOL 10 arrives at the destination. Similarly to the case of the hovering mode, the object to be diagnosed includes a device and equipment that are driven by the flight control device 40 in the cruise mode, the vertical landing mode, the hovering mode, and the mode switching.

Regarding the diagnostic criterion in the mode switching, the flight control device 40 sets, as the diagnostic criterion, a normal range of each of various types of information acquired in the mode switching in the eVTOL 10. The various types of information for which the diagnostic criteria are set in the mode switching include various types of information that are acquired from when the mode switching is performed after the eVTOL 10 vertically takes off to when the eVTOL 10 arrives at the destination. For example, similarly to the cases of the cruise mode and the hovering mode, the various types of information include various types of information acquired by the flight control device 40 in each of the cruise mode, the vertical landing mode, the hovering mode, and the mode switching, excluding the vertical take-off mode.

When a negative determination is made in step S210, the flight control device 40 proceeds to step S212 and determines whether the eVTOL 10 is on the ground. Examples of the case where the eVTOL 10 is on the ground include a case where landing of the eVTOL 10 according to the vertical landing mode is completed and a case where the operating mode is the take-off preparation mode. When the eVTOL 10 is on the ground, the flight control device 40 proceeds to step S213 and sets the diagnostic condition for being on the ground. The flight control device 40 sets a diagnostic cycle, an object to be diagnosed, and a diagnostic criterion as diagnostic conditions for being on the ground. The function of the flight control device 40 executing the processing of step S213 corresponds to a landed-state cycle unit.

Regarding the diagnostic cycle when being on the ground, the flight control device 40 sets a predetermined on-the-ground cycle as the diagnostic cycle. The on-the-ground cycle is, for example, a cycle longer than the vertical take-off cycle. The on-the-ground cycle is substantially the same as the cruise cycle. For example, when being on the ground, the flight control device 40 performs the abnormality diagnosis of step S102 once every time the flight control processing is performed predetermined multiple times. The on-the-ground cycle corresponds to a landed-state cycle.

Regarding the object to be diagnosed when being on the ground, the flight control device 40 sets, as the object to be diagnosed, a device and equipment driven when the eVTOL 10 is on the ground. The object to be diagnosed includes, for example, a device and equipment driven by the flight control device 40 in the take-off preparation mode. The object to be diagnosed includes, for example, a device and equipment driven by the flight control device 40 after landing of the eVTOL 10 according to the vertical landing mode is completed.

Regarding the diagnostic criterion when being on the ground, the flight control device 40 sets, as the diagnostic criterion, a normal range of each of various types of information acquired when the eVTOL 10 is on the ground. The various types of information for which the diagnostic criteria are set include various types of information acquired by the flight control device 40 when being on the ground.

When a negative determination is made in step S212, the flight control device 40 proceeds to step S214 and performs holding processing. The flight control device 40 ends the diagnosis preparation processing without setting the diagnostic condition in the holding processing.

The diagnosis preparation processing will be collectively described. In the eVTOL 10, the flight control device 40 performs the diagnosis preparation processing on the premise that a portion such as a device or a function in which an abnormality has occurred can be appropriately detected and that diagnosis necessary for coping with abnormality occurrence can be appropriately performed. In steps S203, S205, S207, and S209, the flight control device 40 sets the diagnostic conditions in accordance with the operating mode. In steps S211 and S213, the flight control device 40 sets the diagnostic conditions in accordance with an operation of the eVTOL 10. The flight control device 40 sets the diagnostic conditions such that an increase in processing load on the flight control device 40 due to performing the abnormality diagnosis is restricted. The flight control device 40 sets the diagnostic conditions such that occurrence of erroneous diagnosis in the abnormality diagnosis is restricted.

The diagnostic cycle in the diagnosis preparation processing will be collectively described. During taking off and landing of the eVTOL 10, the flight control device 40 shortens the diagnostic cycle since it is necessary to quickly detect an abnormality. In the cruise mode, even if an abnormality occurs in the thrust of the eVTOL 10, the eVTOL 10 can fly by inertia. Therefore, the load on the flight control device 40 can be reduced by the flight control device 40 making the diagnostic cycle in the cruise mode longer than the diagnostic cycle in the vertical take-off mode. However, when the flight speed of the eVTOL 10 is equal to or lower than the predetermined cruising speed, an inertial force generated in the eVTOL 10 tends to be insufficient, and thus the flight control device 40 shortens the diagnostic cycle with reference to the vertical take-off mode.

The flight control device 40 sets the diagnostic cycle in the hovering mode and the diagnostic cycle in the vertical landing mode to the same cycle as the diagnostic cycle in the vertical take-off mode. In the mode switching, there is a risk that the airframe of the eVTOL 10 becomes unstable, and the diagnostic cycle thereof is preferably short. Therefore, the flight control device 40 sets the diagnostic cycle in the mode switching to the same cycle as the diagnostic cycle in the vertical take-off mode. The flight control device 40 sets the diagnostic cycle when being on the ground to be longer.

The object to be diagnosed in the diagnosis preparation processing will be collectively described. The flight control device 40 performs the abnormality diagnosis taking the EPU 50 in operation as an object to be diagnosed. For example, in the cruise mode, the flight control device 40 performs the abnormality diagnosis of the EPU 50 of the rotor 20 functioning as a cruise rotor. In the cruise mode, although the rotor 20 functioning as the lift rotor or the hovering rotor is present, it is unnecessary to perform the abnormality diagnosis of the EPU 50 of the rotor 20. Therefore, in the cruise mode, although the rotor 20 functioning as the lift rotor or the hovering rotor is present, the flight control device 40 does not include the EPU 50 of the rotor 20 as an object to be diagnosed.

Alternatively, in the cruise mode, when the rotor 20 functioning as the lift rotor or the hovering rotor is present, the flight control device 40 may include the EPU 50 of the rotor 20 in the object to be diagnosed. In this case, the flight control device 40 preferably extends the diagnostic cycle of the EPUs 50 for the rotor 20 functioning as the lift rotor or the hovering rotor. For example, the flight control device 40 sets the diagnostic cycle in this case to a cycle longer than the cruise cycle.

The flight control device 40 performs the abnormality diagnosis for the tilt mechanism 38 in the mode switching. On the other hand, in the vertical landing mode, it is assumed that the tilt mechanism 38 is not operated until the vertical landing of the eVTOL 10 is completed. Therefore, it is unnecessary for the flight control device 40 to perform the abnormality diagnosis for the tilt mechanism 38. Further, there is a high possibility that the eVTOL 10 cannot output a large thrust when being on the ground. Therefore, the flight control device 40 includes, in the object to be diagnosed, a diagnostic item that does not require a large thrust force of the eVTOL 10, such as a diagnostic item of detecting occurrence of disconnection and short circuit in the eVTOL 10.

The diagnostic criteria in the diagnosis preparation processing will be described collectively. In the eVTOL 10, an operating state of the EPU 50 varies depending on the operating mode. Normal ranges of sensor values that are the detection results of the various sensors vary depending on the operating mode. Therefore, the flight control device 40 sets the diagnostic criterion in accordance with at least one of the operating state of the EPU 50 and the normal range of the sensor value. However, with respect to the sensor value that gradually changes even when the operating mode is switched, the flight control device 40 gradually changes the diagnostic criterion using a calculation model or the like. Examples of the sensor value that gradually changes even when the operating mode is switched include a sensor value of a temperature sensor.

Returning to FIG. 3, the flight control device 40 performs fail-safe mode processing when it is diagnosed in step S102 that an abnormality has occurred. The flight control device 40 performs processing of steps S103 to S110 as the fail-safe mode processing. The fail-safe mode is a mode for landing the eVTOL 10 in a state in which an abnormality has occurred. In the fail-safe mode, the eVTOL 10 is evacuated from a flying state to a landed state. Examples of the fail-safe mode include a landing continuation mode, an emergency landing mode, a resetting mode, a search flight mode, and a take-off prohibition mode. Examples of the emergency landing mode includes a direct landing mode and a temporary ascending mode. The fail-safe mode may be referred to as an evacuation mode. The flight of the eVTOL 10 in the fail-safe mode may be referred to as a fail safe flight or an evacuation flight. The function of the flight control device 40 executing the processing of steps S103 to S110 corresponds to a fail safe unit.

In a state where the operating mode is set to the fail-safe mode, the flight control device 40 can automatically execute at least a part of the processing to be performed in the fail-safe mode. When the operating mode is set to the fail-safe mode, the flight control device 40 automatically performs at least a part of the processing for causing the eVTOL 10 to perform the fail safe flight. For example, in a state where the operating mode is set to the emergency landing mode, at least a part of the processing for causing the eVTOL 10 to perform emergency landing is automatically performed by the flight control device 40. Similarly, in each of the landing continuation mode, the resetting mode, the search flight mode, and the take-off prohibition mode, at least a part of the processing performed in the corresponding mode is automatically performed by the flight control device 40.

In the processing of the fail-safe mode, the flight control device 40 determines in step S103 whether the eVTOL 10 is in flight. The flight control device 40 determines that the eVTOL 10 is in flight when the operating mode is any of the vertical take-off mode, the cruise mode, the vertical landing mode, and the hovering mode. When the operating mode is the take-off preparation mode, the flight control device 40 determines that the eVTOL 10 is not in flight. In the present embodiment, a state in which the eVTOL 10 is flying is referred to as "being in flight". Examples of the case where the eVTOL 10 is in flight include, for example, cases where the eVTOL 10 is taking off vertically, landing vertically, cruising, and hovering.

When the eVTOL 10 is in flight, the flight control device 40 proceeds to step S104 and determines whether the operating mode is the vertical landing mode. When the operating mode is the vertical landing mode, the flight control device 40 proceeds to step S105 and performs landing continuation mode processing. In the landing continuation mode processing, the flight control device 40 changes the operating mode to the landing continuation mode. The landing continuation mode is a mode for causing the eVTOL 10 to continue vertical landing in a state where an abnormality has occurred in the eVTOL 10 during vertical landing. When the operating mode is set to the landing continuation mode, the flight control device 40 performs the flight control such that the eVTOL 10 in a state in which an abnormality has occurred can vertically land. For example, when the operating mode is set to the landing continuation mode in a state where an abnormality has occurred in one EPU 50, the flight control device 40 drives the other EPUs 50 so that the eVTOL 10 can vertically land in a state where driving of the EPU 50 in which the abnormality has occurred is stopped.

After step S105, the flight control device 40 proceeds to step S111 and performs recording processing. In the recording processing, the flight control device 40 stores abnormality information regarding the eVTOL 10 in the storage device 35. The abnormality information includes abnormality contents indicating contents of the abnormality in the eVTOL 10. The abnormality contents may be referred to as an abnormal condition. The flight control device 40 performs transmission processing in step S112. In the transmission processing, the flight control device 40 transmits the abnormality information to the management center 155.

When a negative determination is made in step S104, the flight control device 40 proceeds to step S106 and determines whether the operating mode is the vertical take-off mode. When the operating mode is the vertical take-off mode, the flight control device 40 proceeds to step S107 and performs emergency landing mode processing. The emergency landing mode is a mode for landing the eVTOL 10 urgently in a state where an abnormality has occurred in the eVTOL 10 during vertical take-off. In the emergency landing mode, the vertical take-off of the eVTOL 10 is stopped, and the vertical landing of the eVTOL 10 is performed. In the emergency landing mode, the vertical landing of the eVTOL 10 is performed by driving at least two of the at least four rotors 20 of the eVTOL 10 to rotate. The emergency landing mode corresponds to an abnormal-landing mode. The function of the flight control device 40 executing the processing of step S107 corresponds to an abnormal-landing unit. After step S107, the flight control device 40 performs the recording processing in step S111, and performs the transmission processing in step S112.

Regarding the altitude of the eVTOL 10, an avoidance range in which the eVTOL 10 does not perform the vertical landing is set. When the eVTOL 10 performs the vertical landing from a sufficiently low altitude and when the eVTOL 10 performs the vertical landing from a sufficiently high altitude, the safety of the eVTOL 10 in the vertical landing is sufficiently high. For example, in the case where the eVTOL 10 performs the vertical landing from a sufficiently low altitude, even if the thrust against gravity cannot be output sufficiently in the eVTOL 10, impact at the time of landing of the eVTOL 10 can be reduced to be small. In the case where the eVTOL 10 performs the vertical landing from a sufficiently high altitude, a time the eVTOL 10 takes to land is long, and thus it is possible to sufficiently secure a time for taking measures necessary for safe landing. On the other hand, when the eVTOL 10 performs vertical landing from a medium altitude, there is a concern that the safety of the eVTOL 10 in the vertical landing is insufficient. In the present embodiment, for the vertical landing of the eVTOL 10, a medium altitude zone in which there is a concern about insufficient safety is referred to in as an avoidance range. Regarding the avoidance range, an upper limit value of the avoidance range is referred to as an avoidance upper limit value Ha, and a lower limit value is referred to as an avoidance lower limit value Hb. The avoidance upper limit value Ha is set to 120 m, for example, and the avoidance lower limit value Hb is any value indicating an altitude, for example. The avoidance upper limit value Ha corresponds to a reference altitude.

Figure 5:
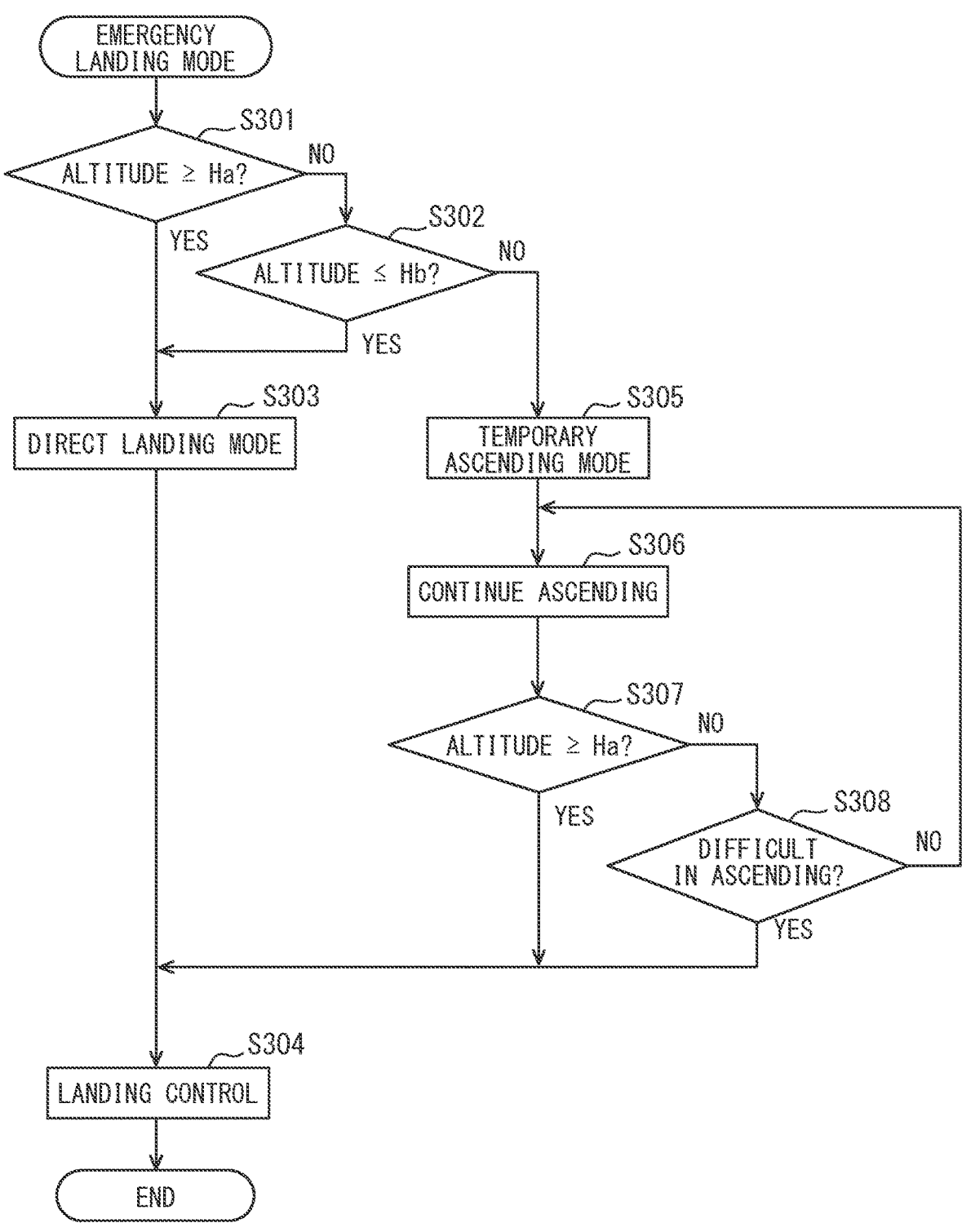
FIG. 5 is a flowchart illustrating a procedure of emergency landing mode processing.

The emergency landing mode processing will be described with reference to the flowchart of FIG. 5. In steps S301 and S302 of the emergency landing mode processing, the flight control device 40 performs altitude determination of determining whether the altitude of the eVTOL 10 falls in the avoidance range. The flight control device 40 detects a current altitude of the eVTOL 10 using the detection result of the sensor group 36 or the like, and performs the altitude determination using the altitude. Specifically, in step S301, the flight control device 40 determines whether the altitude of the eVTOL 10 is equal to or greater than the avoidance upper limit value Ha. In step S302, the flight control device 40 determines whether the altitude of the eVTOL 10 is equal to or less than the avoidance lower limit value Hb.

When the altitude of the eVTOL 10 is equal to or greater than the avoidance upper limit value Ha, or when the altitude of the eVTOL 10 is equal to or less than the avoidance lower limit value Hb, the flight control device 40 determines that the altitude of the eVTOL 10 does not fall in the avoidance range, and performs direct landing mode processing in steps S303 and S304. In step S303 of the direct landing mode processing, the flight control device 40 changes the operating mode to the direct landing mode serving as the emergency landing mode. The function of the flight control device 40 executing the processing of step S303 corresponds to a direct landing unit.

The direct landing mode is a mode for causing the eVTOL 10 to vertically landing directly from the current altitude in a state where an abnormality has occurred in the eVTOL 10 during vertical take-off. The direct landing mode is a mode for the eVTOL 10 to vertically land by descending, without ascending, from the current altitude when the altitude of the eVTOL 10 does not fall in the avoidance range. When the altitude of the eVTOL 10 is equal to or greater than the avoidance upper limit value Ha and when the altitude of the eVTOL 10 is equal to or less than the avoidance lower limit value Hb, the altitude of the eVTOL 10 does not fall in the avoidance range.

In step S304 of the direct landing mode processing, the flight control device 40 performs landing control as processing for vertically landing the eVTOL 10 in the direct landing mode. The flight control device 40 performs flight control such that the eVTOL 10 in a state where an abnormality has occurred can vertically land. For example, when the operating mode is set to the direct landing mode in a state where an abnormality has occurred in one EPU 50, the flight control device 40 drives the other EPUs 50 so that the eVTOL 10 can vertically land in a state where driving of the EPU 50 in which the abnormality has occurred is stopped.

When the altitude of the eVTOL 10 is not equal to or greater than the avoidance upper limit value Ha and the altitude of the eVTOL 10 is not equal to or less than the avoidance lower limit value Hb, the flight control device 40 determines that the altitude of the eVTOL 10 does not fall in the avoidance range. In this case, the flight control device 40 performs temporary ascending mode processing in steps S305 to S308 and S304. In step S305 of the temporary ascending mode processing, the flight control device 40 changes the operating mode to the temporary ascending mode serving as the emergency landing mode. The function of the flight control device 40 executing the processing of step S305 corresponds to a temporary ascending unit.

The temporary ascending mode is a mode for vertically landing the eVTOL 10 after ascending to the avoidance upper limit value Ha or more in a state where an abnormality has occurred in the eVTOL 10 during vertical take-off. In the temporary ascending mode, the eVTOL 10 temporarily ascends to reach the avoidance upper limit value Ha, and thereafter, the eVTOL 10 performs vertical landing from an altitude equal to or greater than the avoidance upper limit value Ha.

The flight control device 40 performs processing for vertically landing the eVTOL 10 in steps S306 to S309 and S304 of the temporary ascending mode processing. In step S306, the flight control device 40 performs flight control such that the eVTOL 10 during vertical take-off continues ascending. For example, when the operating mode is set to the temporary ascending mode in a state where an abnormality has occurred in one EPU 50, the flight control device 40 drives the other EPUs 50 so that the eVTOL 10 can ascend in a state where driving of the EPU 50 in which the abnormality has occurred is stopped.

In step S307, the flight control device 40 determines whether the eVTOL 10 that continues to ascend in the temporary ascending mode has ascended to the avoidance upper limit value Ha. For example, the flight control device 40 measures an elapsed time from when the operating mode is changed to the temporary ascending mode, and determines whether the altitude of the eVTOL 10 is equal to or greater than the avoidance upper limit value Ha, until the elapsed time reaches a predetermined determination time. When the altitude of the eVTOL 10 becomes equal to or greater than the avoidance upper limit value Ha during the determination time, the flight control device 40 determines that the eVTOL 10 has ascended to the avoidance upper limit value Ha.

When the eVTOL 10 ascends to the avoidance upper limit value Ha in the temporary ascending mode, the flight control device 40 proceeds to step S304. In step S304, the flight control device 40 performs landing control in the temporary ascending mode, as processing for vertically landing the eVTOL 10 in the temporary ascending mode. As the landing control in the temporary ascending mode, the flight control device 40 performs flight control such that the eVTOL 10 in a state in which an abnormality has occurred can vertically land.

When the altitude of the eVTOL 10 has not reached the avoidance upper limit value Ha in the temporary ascending mode, the flight control device 40 proceeds to step S308. In step S308, the flight control device 40 determines whether the eVTOL 10 has difficulty in ascending. For example, the flight control device 40 determines whether the eVTOL 10 has ascended by ascending continuation processing of step S306. The flight control device 40 determines whether the amount of ascending of the ascending eVTOL 10 per unit time has reached a predetermined determination amount. When the eVTOL 10 has not ascended or when the amount of ascending per unit time has not reached the determination amount, the flight control device 40 determines that the eVTOL 10 has difficulty in ascending.

When the eVTOL 10 has difficulty in ascending, the flight control device 40 proceeds to step S304. In step S304, the flight control device 40 stops flight control of causing the eVTOL 10 to ascend, and performs the landing control in the temporary ascending mode. When the eVTOL 10 has no difficulty in ascending, the flight control device 40 proceeds to step S306 and continues the flight control for continuing the ascending of the eVTOL 10.

The emergency landing mode processing will be collectively described. The flight control device 40 quickly shifts the operating mode to the emergency landing mode when an abnormality is detected during a take-off operation. However, in a case where an abnormality is detected in a low altitude state, increasing the altitude of the eVTOL 10 to the avoidance upper limit value Ha, which is a certain degree of altitude, preferably buys more time until landing and airframe control is easier. Therefore, when the altitude of the eVTOL 10 is a low altitude not reaching the avoidance upper limit value Ha, the flight control device 40 causes the eVTOL 10 to ascend to a certain degree. However, when the altitude of the eVTOL 10 is not low enough to reach the avoidance lower limit value Hb, the flight control device 40 lands the eVTOL 10 as it is without causing the eVTOL 10 to ascend, assuming that the altitude is a very low altitude that is safe even when landing as it is. When the eVTOL 10 does not ascend while the flight control device 40 issues an ascent command, the flight control device 40 lands the eVTOL 10 as it is.

Returning to FIG. 3, regarding steps S104 and S106, when the operating mode is neither the vertical landing mode nor the vertical take-off mode, the flight control device 40 assumes that the operating mode is the cruise mode or the hovering mode, and proceeds to step S108. The flight control device 40 performs resetting mode processing in step S108. The resetting mode is a mode for resetting the flight route of the eVTOL 10 in a state where an abnormality has occurred in the eVTOL 10 during cruising or hovering. In the resetting mode, a fail safe route for landing the eVTOL 10 in a state where an abnormality has occurred is set as the flight route. In the resetting mode, the eVTOL 10 flies to the destination along the fail safe route by driving at least two of the at least four rotors 20 to rotate. The function of the flight control device 40 executing the processing of step S108 corresponds to a resetting unit. After step S108, the flight control device 40 performs the recording processing in step S111, and performs the transmission processing in step S112.

Figure 6:
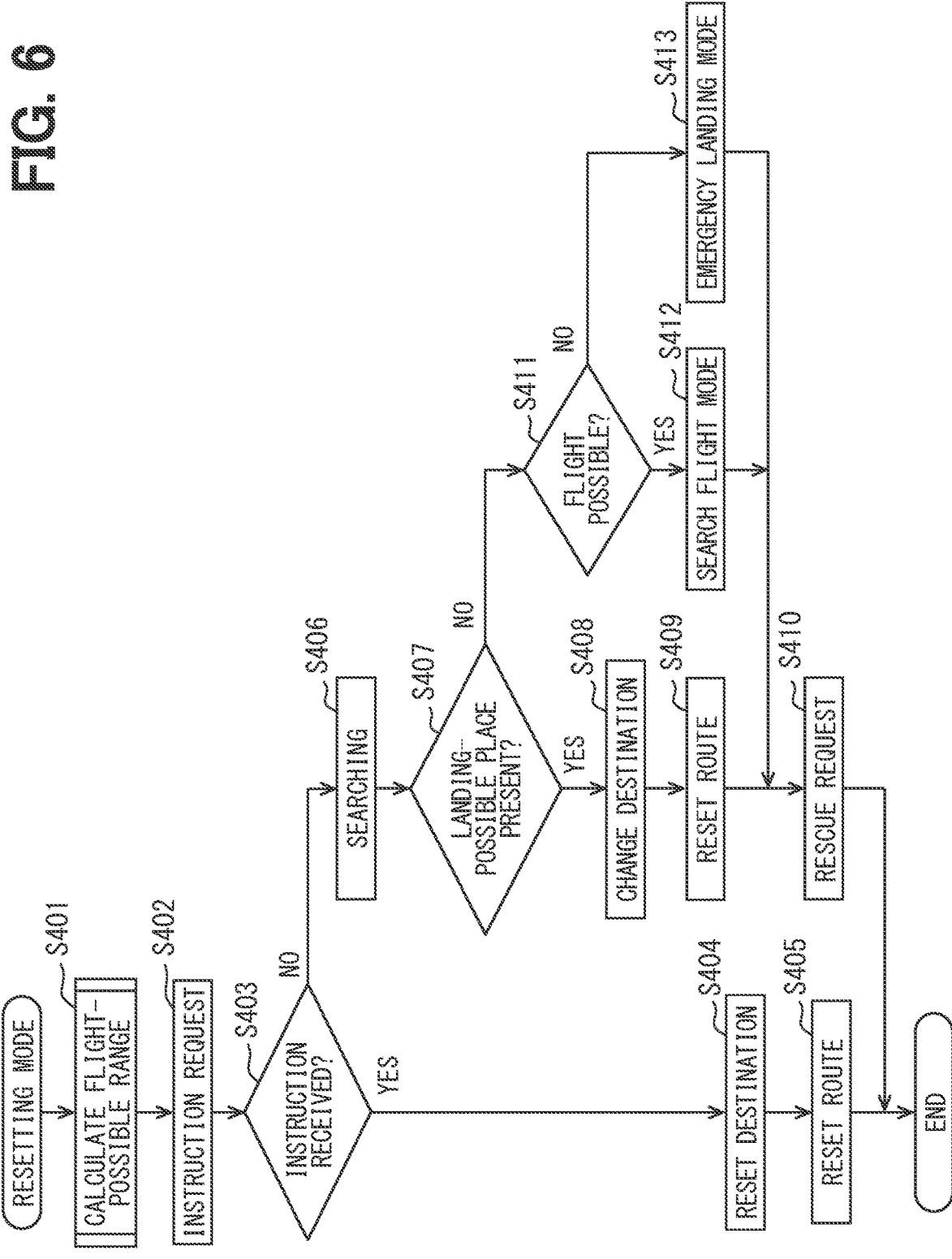
FIG. 6 is a flowchart illustrating a procedure of resetting mode processing.

The resetting mode processing will be described with reference to the flowchart of FIG. 6. In step S401 of the resetting mode processing, the flight control device 40 performs flight-possible range calculation processing. The flight-possible range calculation processing is processing for calculating a flight-possible range for the eVTOL 10 in a state where an abnormality has occurred. The function of the flight control device 40 executing the processing of step S401 corresponds to a range calculation unit.

Figure 7:
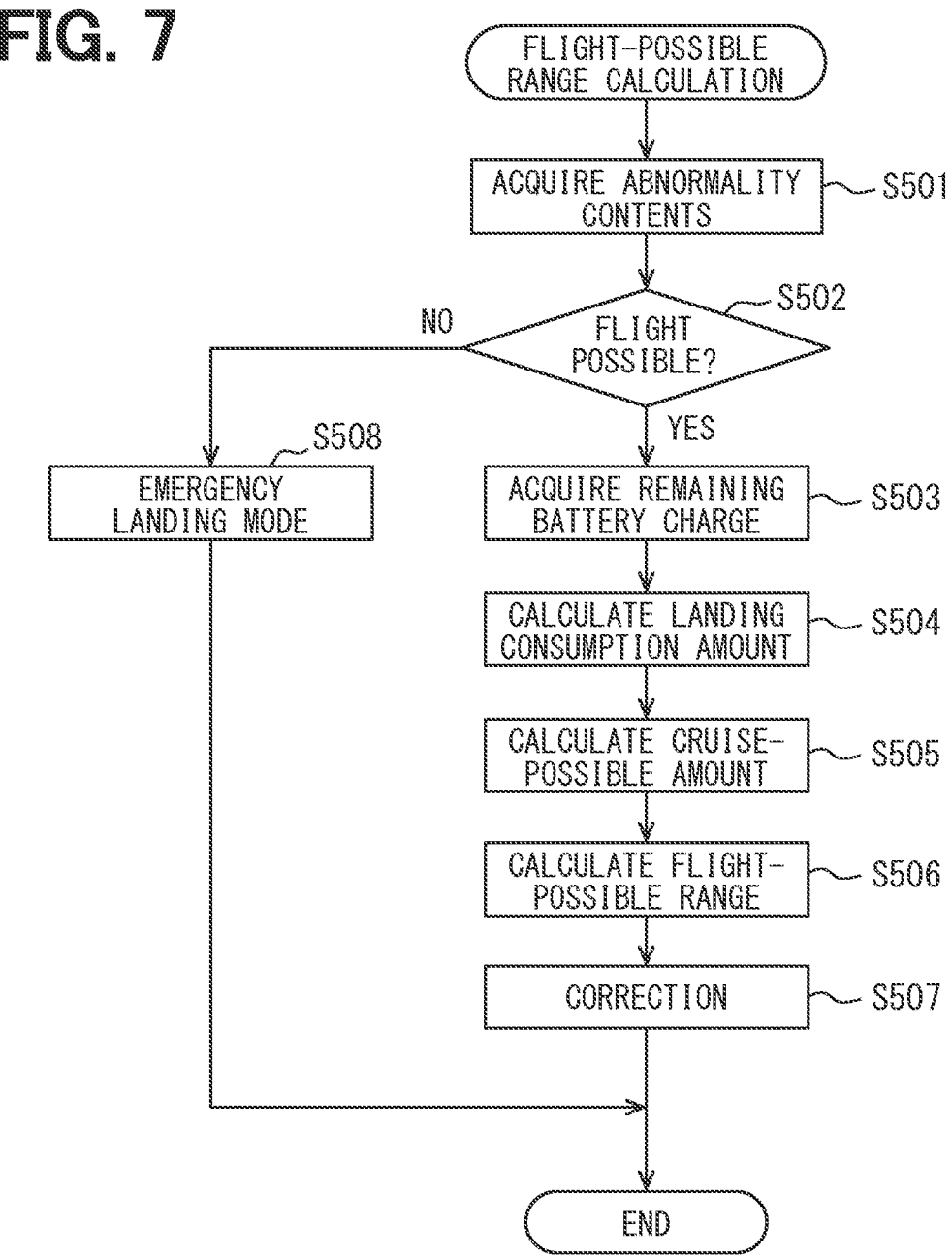
FIG. 7 is a flowchart illustrating a procedure of flight-possible range calculation processing.

The flight-possible range calculation processing will be described with reference to the flowchart of FIG. 7. The flight control device 40 acquires abnormality contents in step S501 of the flight-possible range calculation processing. The abnormality contents include information indicating in which device and equipment an abnormality has occurred, and how much the device and equipment in which the abnormality has occurred operate. The flight control device 40 acquires abnormality contents according to the detection results of the various sensors. The flight control device 40 determines flight availability and restriction contents according to the abnormality contents. For example, abnormality correspondence information, in which the abnormality contents are made corresponding to at least one of the flight availability and the restriction contents, is stored in the storage device 35 for each abnormality content. The flight control device 40 reads the abnormality correspondence information from the storage device 35, and sets the flight availability and the restriction contents by using the abnormality correspondence information. The flight availability is information indicating whether the eVTOL 10 can perform cruising. The restriction contents are information indicating that the flight of the eVTOL 10 is restricted so that a secondary failure caused by failure occurrence of the EPU 50 or the like does not occur.

The flight control device 40 determines whether flight is possible in step S502. For example, the flight control device 40 determines whether the flight-possible range in which the eVTOL 10 can fly by cruising is zero. When the flight-possible range is zero, the flight control device 40 determines that flight is not possible, and proceeds to step S508. In step S508, the flight control device 40 performs processing for landing the eVTOL 10. For example, the flight control device 40 performs the emergency landing mode processing as in step S107, and quickly changes the operating mode to the emergency landing mode. In this case, the flight control device 40 changes the operating mode to the direct landing mode or the temporary ascending mode, and performs vertical landing of the eVTOL 10.

When the flight-possible range is not zero, the flight control device 40 assumes that flight is possible, proceeds to step S503, and acquires a remaining battery charge. The remaining battery charge is the remaining amount of electric power stored in the battery 31. The flight control device 40 calculates a current remaining battery charge according to a detection result of the voltage sensor 57 or the like. The remaining battery charge corresponds to an electric power remaining amount.

In step S504, the flight control device 40 calculates a landing consumption amount. The landing consumption amount is a consumption amount of electric power consumed when the eVTOL 10 vertically lands. For example, altitude correspondence information, in which the altitude of the eVTOL 10 is made corresponding to the landing consumption amount, is stored in the storage device 35 for each altitude. The flight control device 40 reads the altitude correspondence information from the storage device 35, and calculates the landing consumption amount corresponding to the current altitude by using the altitude correspondence information.

In step S505, the flight control device 40 calculates a cruise-possible amount. The cruise-possible amount is the amount of electric power that can be used for cruising of the eVTOL 10. That is, the cruise-possible amount is a remaining battery charge that can be consumed to move the eVTOL 10 in the horizontal direction. The flight control device 40 calculates a value, which is obtained by subtracting the landing consumption amount from the current remaining battery charge, as the cruise-possible amount. The cruise-possible amount corresponds to an actual remaining amount.

In step S506, the flight control device 40 calculates a flight-possible distance. The flight control device 40 assumes that the eVTOL 10 in a normal state has flown under a steady condition, and calculates the flight-possible distance over which the eVTOL 10 can fly by cruising with the current cruise-possible amount. The flight-possible distance may be referred to as a flight-possible distance in a standard state. Examples of the steady condition includes a weather condition in which a cruise consumption amount is less likely to be affected by the weather. The cruise consumption amount is a consumption amount of electric power consumed when the eVTOL 10 is cruising.

In step S507, the flight control device 40 performs correction processing of the flight-possible distance. In the correction processing, the flight control device 40 corrects the flight-possible distance in the standard state according to the abnormality contents. In the eVTOL 10, when an occurred abnormality is a failure of the EPU 50, the influence on the flight-possible distance varies depending on the position and the number of the failed EPU 50. For example, when the number of the EPUs 50 that can be driven in the eVTOL 10 decreases, the other EPUs 50 are controlled under operating conditions different from those in a normal state. The flight control device 40 corrects the flight-possible distance according to at least one of the position and the number of the failed EPU 50.

The flight control device 40 sets a correction coefficient according to the abnormality contents, and corrects the flight-possible distance using the correction coefficient. Coefficient correspondence information, in which the abnormality contents are made corresponding to correction coefficients, is stored in the storage device 35 for each abnormality content. The flight control device 40 reads the coefficient correspondence information from the storage device 35 and acquires the correction coefficient by using the coefficient correspondence information. The flight control device 40 calculates a corrected flight-possible distance by multiplying the flight-possible distance in the standard state by the correction coefficient. The flight control device 40 calculates the flight-possible range using the corrected flight-possible distance.

Returning to FIG. 6, after step S401, the flight control device 40 proceeds to step S402 and issues an instruction request to the management center 155. As an instruction the flight control device 40 requests of the management center 155, there is an instruction regarding setting which of a plurality of landing fields as a landing destination of the eVTOL 10. The flight control device 40 transmits required information required for the management center 155 to determine the landing destination of the eVTOL 10 to the management center 155. The required information includes information indicating the flight-possible range. The flight control device 40 issues a request to the management center 155 regarding whether there is a landing field where emergency landing can be performed within a flight-possible range estimated from an abnormal condition, a remaining battery charge, or the like. The required information may include information indicating the flight-possible distance. The processing of transmitting the abnormality information to the management center 155 is performed in step S111, and may be performed in step S402.

In step S403, the flight control device 40 determines whether an instruction from the management center 155 is received. The flight control device 40 measures an elapsed time from issuance of the instruction request in step S402, and determines whether the elapsed time reaches a predetermined determination time. When an instruction is received from the management center 155 before the elapsed time from issuance of the instruction request reaches the determination time, the flight control device 40 proceeds to step S404. The determination time may be variably set to a value corresponding to the abnormality contents, for example.

In the management center 155, the management device 151 or the like determines whether a regular landing field is present within a range in which the eVTOL 10 can actually reach. For example, the management device 151 calculates an actual range, in which the eVTOL 10 can actually reach, based on the information on the flight-possible range received from the eVTOL 10 and further in consideration of a restricted airspace and weather conditions such as a wind direction, and determines whether a regular landing field is present in the actual range. When multiple landing fields where landing can be performed are present in the actual range and a landing field originally set as the destination is among the landing fields, the management device 151 designates the landing field as the destination. When there is no landing field originally set as the destination among the multiple landing fields present in the actual range, the management device 151 designates a landing field that the eVTOL 10 can reach at the shortest distance as the destination. For the landing field designated as the destination, the management device 151 or the like in the management center 155 performs communication notifying that the destination is designated.

In step S404, the flight control device 40 resets the destination of the eVTOL 10 in response to the instruction from the management center 155. The flight control device 40 sets the landing field instructed by the management center 155 as the destination. The function of the flight control device 40 executing the processing of step S404 corresponds to a destination setting unit.

In step S405, the flight control device 40 resets a flight route. The flight control device 40 sets the flight route in accordance with the destination set in step S404. The destination of the eVTOL 10 before occurrence of the abnormality is referred to as an initial destination, and the destination set in step S404 is referred to as a reset destination. Even in a case where the reset destination and the initial destination are the same landing field, the flight control device 40 can change the flight route to the landing field, for example, when the flight route can be shortened.

After resetting the flight route, the flight control device 40 performs processing for landing the eVTOL 10 at the reset destination. For example, the flight control device 40 performs cruise control in the resetting mode. As the cruise control in the resetting mode, the flight control device 40 performs the flight control such that the eVTOL 10 in a state where an abnormality has occurred can perform cruising. For example, when the operating mode is set to the resetting mode in a state where an abnormality has occurred in one EPU 50, the flight control device 40 drives the other EPUs 50 so that the eVTOL 10 can perform cruising in a state where driving of the EPU 50 in which the abnormality has occurred is stopped. When the eVTOL 10 reaches above the reset destination by cruising, the flight control device 40 performs processing for landing the eVTOL 10. For example, the flight control device 40 performs the emergency landing mode processing as in steps S107 and S508, and changes the operating mode to the emergency landing mode.

When no instruction from the management center 155 is received, the flight control device 40 independently performs independent processing in steps S406 to S413 in order to land the eVTOL 10. Examples of the case where no instruction from the management center 155 is received include a case where there is no reply from the management center 155 and a case where there is a reply from the management center 155 indicating that there is no landing field where the eVTOL 10 can land.

The flight control device 40 performs search processing in step S406 of the independent processing. In the search processing, the flight control device 40 searches for a landing-possible place such as a level land where the eVTOL 10 can land. The flight control device 40 searches for the landing-possible place using, for example, an image captured by the imaging device 37. The flight control device 40 searches a target range that can be imaged by the imaging device 37 from a current location of the eVTOL 10. The flight control device 40 performs the search processing in a state where the eVTOL 10 is cruising or hovering. The landing-possible place is not a regular landing field that is approved by the management center 155. The landing-possible place may be referred to as a non-regular landing field that is not approved by the management center 155. The flight control device 40 may search for a water surface of a pool or the like as the landing-possible place.

In step S407, the flight control device 40 determines whether there is a landing-possible place by using a result of the search processing. When there is a landing-possible place as a result of the search, the flight control device 40 proceeds to step S408 and sets the landing-possible place found by the search as a destination. The function of the flight control device 40 executing the processing of step S408 corresponds to the destination setting unit.

In step S409, the flight control device 40 resets the flight route. The flight control device 40 changes the flight route in accordance with the landing-possible place. After resetting the flight route, the flight control device 40 performs processing for landing the eVTOL 10 at the reset destination as in step S405. For example, the flight control device 40 performs the cruise control in the resetting mode and the emergency landing mode processing, and changes the operating mode to the emergency landing mode.

In step S410, the flight control device 40 issues a rescue request to the management center 155. The flight control device 40 transmits, for example, information on a position where the eVTOL 10 has landed and information on an occupant such as the number of occupants to the management center 155 as the rescue request.

When no landing-possible place can be found by the search, the flight control device 40 proceeds to step S411. In step S411, the flight control device 40 determines whether flight of the eVTOL 10 is possible, as in step S502. When flight of the eVTOL 10 is possible, the flight control device 40 proceeds to step S412 and performs search flight mode processing. In the search flight mode processing, the flight control device 40 changes the operating mode to the search flight mode. The search flight mode is a mode for causing the eVTOL 10 to fly while searching for a landing-possible place. The search flight mode is continued until the flight control device 40 finds a landing-possible place. In the search flight mode, the flight control device 40 performs the search processing as in step S406 while causing the eVTOL 10 to cruise.

When the landing-possible place is found, the flight control device 40 sets the found landing-possible place as the reset destination and changes the flight route, as in steps S408 and S409. Then, the flight control device 40 performs the processing for landing the eVTOL 10 at the reset destination as in step S405. For example, the flight control device 40 performs the cruise control in the search flight mode and the emergency landing mode processing, and changes the operating mode to the emergency landing mode.

When flight of the eVTOL 10 is not possible, the flight control device 40 assumes that the eVTOL 10 is to be forced to land at a place that is not a landing-possible place, and proceeds to step S413. In step S413, the flight control device 40 performs the emergency landing mode processing as in step S107, and changes the operating mode to the emergency landing mode. For example, when the eVTOL 10 is flying above a water surface, the flight control device 40 vertically lands the eVTOL 10 on the water surface. In the present embodiment, regarding the eVTOL 10, landing includes landing on a water surface.

The flight control device 40 proceeds to step S410 regardless of whether the processing of step S412 or S413 is performed, and makes a rescue request to the management center 155. The flight control device 40 transmits a rescue request to the management center 155 when the eVTOL 10 lands at a place other than a place approved by the management center 155 such as a landing-possible place.

The resetting mode will be collectively described. When the flight control device 40 has detected an abnormality, it is preferable to land the eVTOL 10 quickly and safely. However, in a case where an abnormality is detected during cruising or hovering, differently from the cases of the vertical take-off mode and the vertical landing mode, there is a possibility that the eVTOL 10 is away from the take-off and landing field. Therefore, when an abnormality is detected during cruising or hovering, it is necessary for the flight control device 40 to reset the flight route. Specifically, the flight control device 40 searches for the nearest safe take-off and landing field, communicates with the management center 155 or the like in order to perform emergency landing at the take-off and landing field, and then changes the flight route to the take-off and landing field. At this time, when the flight control device 40 determines that the flight control device 40 cannot reach a regular take-off and landing field due to a failed state, a remaining battery charge, or the like, the flight control device 40 searches for a land allowing a safe landing. The land allowing a safe landing includes, for example, a level land having a predetermined area or more. As a search method, the flight control device 40 may recognize a level land using a camera or the like serving as the imaging device 37 mounted on the eVTOL 10, or the management center 155 may indicate a landing place to the eVTOL 10.

Returning to FIG. 3, when the eVTOL 10 is not in flight, the flight control device 40 assumes that the eVTOL 10 is on the ground, and proceeds to step S109. In step S109, the flight control device 40 performs take-off prohibition mode processing. The flight control device 40 changes the operating mode to the take-off prohibition mode in the take-off prohibition mode processing. The take-off prohibition mode is a mode for prohibiting take-off of the eVTOL 10. When the operating mode is set to the take-off prohibition mode, the flight control device 40 sets a take-off prohibition flag in the memory or the like. The take-off prohibition flag is a flag indicating that take-off of the eVTOL 10 is prohibited. In the take-off prohibition mode, take-off of the eVTOL 10 is restricted by setting the take-off prohibition flag. The take-off prohibition mode corresponds to a take-off restriction mode. The function of the flight control device 40 executing the processing of step S109 corresponds to a take-off restriction unit.

When the take-off prohibition flag is set, the flight control device 40 performs take-off prohibition processing. The take-off prohibition processing is processing of prohibiting the pilot from performing an operation for causing the eVTOL 10 to vertically take off. The take-off prohibition processing includes notification processing of notifying the pilot or the like that vertical take-off of the eVTOL 10 is prohibited. The take-off prohibition processing also includes restriction processing of restricting an operation unit, which is operated to cause the eVTOL 10 to vertically take off, so as not to operate. For the eVTOL 10 in a state in which an abnormality has occurred, it is the safest not to take off.

In step S110, the flight control device 40 performs inspection request processing. In the inspection request processing, the flight control device 40 notifies an inspection request of the eVTOL 10. The processing of notifying the inspection request includes notification processing of notifying that an inspection of the eVTOL 10 is required. The inspection request may include abnormality information on the eVTOL 10. After step S110, the flight control device 40 performs the recording processing in step S111, and performs the transmission processing in step S112.

A worker such as a maintenance person performs abnormality elimination work such as repair to eliminate an abnormality with respect to the eVTOL 10 for which the inspection request is performed by the take-off prohibition mode processing. After the abnormality elimination work for the eVTOL 10 on the ground is completed, the worker performs inspection work of inspecting the eVTOL 10. The diagnostic device 160 is used for the inspection work. The worker causes the diagnostic device 160 to perform the inspection processing in a state where the diagnostic device 160 is connected to the flight control device 40. The inspection processing is processing of performing inspection to confirm that there is no abnormality in the eVTOL 10. In the inspection processing, the take-off prohibition flag set by the take-off prohibition mode processing can be released. The diagnostic device 160 starts the inspection processing when the worker performs an operation for executing the inspection processing.

The inspection processing will be described with reference to the flowchart of FIG. 9. The diagnostic device 160 has a function of executing each step of the inspection processing.

Figure 9:
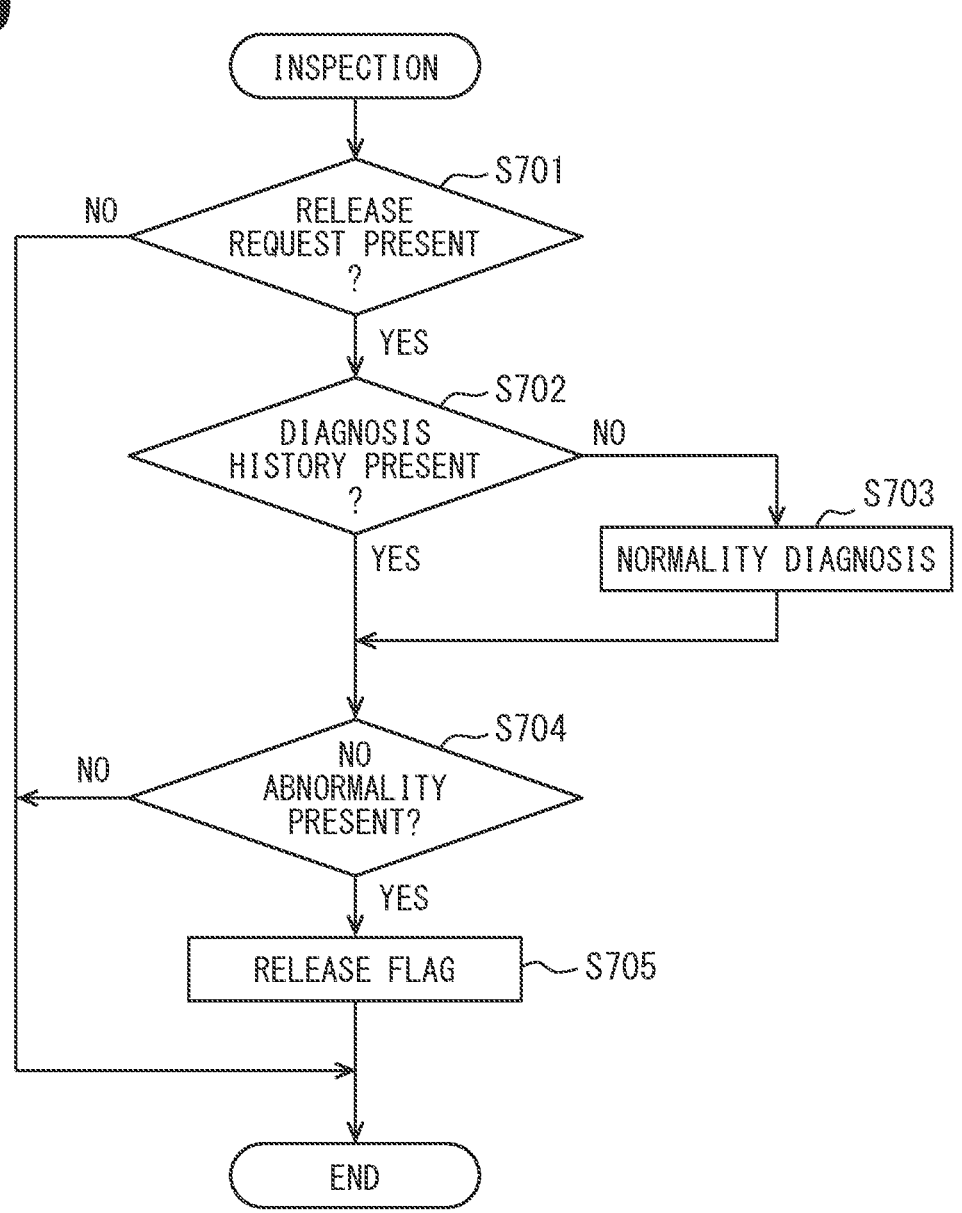
FIG. 9 is a flowchart illustrating a procedure of inspection processing.

In step S701 illustrated in FIG. 9, the diagnostic device 160 determines whether a release request is present. The release request is a request for releasing the take-off prohibition flag. For example, the diagnostic device 160 determines whether an operation for releasing the take-off prohibition flag is performed by the worker on the diagnostic device 160. When an operation for releasing the take-off prohibition flag is performed on the diagnostic device 160, the diagnostic device 160 determines that a release request is present, and proceeds to step S702.

In step S702, the diagnostic device 160 determines whether a diagnosis history is present. The diagnosis history is a history indicating that the flight control device 40 has performed normality diagnosis. The flight control device 40 can perform the normality diagnosis. The normality diagnosis is diagnosis for confirming that the eVTOL 10 is normal, and determines whether the eVTOL 10 is normal. Contents of the normality diagnosis are basically the same as those of the abnormality diagnosis. For example, in the normality diagnosis, the abnormality diagnosis is performed for all the normal modes. The normality diagnosis is performed by the flight control device 40 when, for example, an operation for performing the normality diagnosis is performed by the worker on the flight control device 40 after the abnormality elimination work is performed by the worker.

When no diagnosis history is present, the diagnostic device 160 proceeds to step S703 and causes the flight control device 40 to perform the normality diagnosis. After the normality diagnosis in step S703 is completed, the diagnostic device 160 proceeds to step S704. In either step S702 or S703, the diagnostic device 160 proceeds to step S704 in a state where the flight control device 40 completes the normality diagnosis.

In step S704, the diagnostic device 160 determines whether a result of the normality diagnosis performed by the flight control device 40 is that no abnormality is present. That is, the diagnostic device 160 determines whether a diagnosis result is "normal". For example, the diagnosis history includes information indicating the result of the normality diagnosis. The diagnostic device 160 determines whether result information of the normality diagnosis included in the diagnosis history is information indicating that no abnormality is present. When multiple diagnosis histories are present, the diagnostic device 160 determines presence or absence of an abnormality based on the latest result of the normality diagnosis.

When the result of the normality diagnosis is that no abnormality is present, the diagnostic device 160 proceeds to step S705 and releases the take-off prohibition flag set by the flight control device 40. For example, the diagnostic device 160 outputs a command for releasing the take-off prohibition flag to the flight control device 40. By releasing the take-off prohibition flag in this way, the eVTOL 10 enters a state in which the eVTOL 10 can take off.

On the other hand, when the result of the normality diagnosis is that an abnormality is present, the diagnostic device 160 ends the present inspection processing without releasing the take-off prohibition flag. In this case, for example, the worker repeatedly performs the abnormality elimination work and the inspection work including the inspection processing until the result of the normality diagnosis is that no abnormality is present.

The inspection processing will be collectively described. In the inspection processing, the release of the take-off prohibition flag is preferably performed after the worker confirms that the eVTOL 10 is normal. Even when the flight control device 40 serving as an internal controller receives a release request from the diagnostic device 160 serving as an external controller, it is preferable to release the take-off prohibition flag after confirming that the diagnosis result obtained by the flight control device 40 is "normal".

In addition to or instead of the flight control device 40, the diagnostic device 160 may perform the normality diagnosis. In this case, the diagnostic device 160 acquires information necessary for performing the normality diagnosis from the flight control device 40, and performs the normality diagnosis using the information. For example, in the inspection processing illustrated in FIG. 9, when the result of the normality diagnosis performed by the flight control device 40 in step S704 is "normal", the normality diagnosis by the diagnostic device 160 may be performed. In this case, even if the result of the normality diagnosis performed by the flight control device 40 is "normal", the take-off prohibition flag may not be released unless the result of the normality diagnosis performed by the diagnostic device 160 is "normal". For example, in a case where the result of the normality diagnosis performed by diagnostic device 160 is "abnormal", it is preferable that the take-off prohibition flag is not released even when the operation for releasing the take-off prohibition flag is performed by the worker on diagnostic device 160.

According to the present embodiment described above, the operating mode is changed to any of the multiple fail-safe modes for landing the eVTOL 10 according to which normal mode the driving mode is when an abnormality has occurred in the eVTOL 10. With this configuration, in order to land the eVTOL 10 in a state in which an abnormality has occurred, a fail-safe mode suitable for an operating mode at the time of occurrence of the abnormality can be used. Therefore, it is possible to enhance safety by the fail-safe mode when an abnormality has occurred in the eVTOL 10.

According to the present embodiment, when the operating mode is the vertical take-off mode and an abnormality has occurred in the eVTOL 10, the operating mode is changed to the emergency landing mode. With this configuration, the eVTOL 10 in a state in which an abnormality has occurred during vertical take-off can descend so as to return along a route through which the eVTOL 10 has passed when ascending. That is, it is possible to vertically land the eVTOL 10 at the shortest distance so that the take-off point and the landing point coincide with each other. Therefore, with respect to the eVTOL 10 in a state in which an abnormality has occurred during vertical take-off, safety at the time of landing can be enhanced. For example, it is possible to restrict occurrence of a secondary abnormality in the eVTOL 10 when landing the eVTOL 10, and to restrict a decrease in safety of the occupant when landing the eVTOL 10.

According to the present embodiment, when an abnormality has occurred in the eVTOL 10 during vertical take-off in the vertical take-off mode, if the altitude of the eVTOL 10 has reached the avoidance upper limit value Ha, the operating mode is changed to the direct landing mode. Since the eVTOL 10 directly vertically lands in the direct landing mode, the time during which the eVTOL 10 is in flight can be shortened as much as possible. Therefore, a possibility that a secondary abnormality occurs in the eVTOL 10 in flight can be lowered by a forced landing mode.

On the other hand, if the altitude of eVTOL 10 has not reached the avoidance upper limit value Ha, the operating mode is changed to the temporary ascending mode. In the temporary ascending mode, since the eVTOL 10 ascends to the avoidance upper limit value Ha or more and then lands vertically, the safety of the eVTOL 10 landing vertically can be enhanced. When an abnormality in which a flight state of the eVTOL 10 is likely to become unstable has occurred, the eVTOL 10 is caused to vertically land from an altitude greater than the avoidance upper limit value Ha, so that it is possible to secure the time required for taking measures corresponding to the abnormality before landing of the eVTOL 10. Therefore, the possibility that a secondary abnormality occurs in the eVTOL 10 in the flight state can be lowered by the temporary ascending mode.

According to the present embodiment, when an abnormality has occurred in the eVTOL 10 during cruise in the cruise mode or during hovering in the hovering mode, the operating mode is changed to the resetting mode. In the resetting mode, since the flight route is reset so that the eVTOL 10 can land at the destination, it is possible to enhance safety in the cruise that the eVTOL 10 in a state where an abnormality has occurred performs until reaching the destination.

According to the present embodiment, in the resetting mode, the destination is reset so as to be included in the flight-possible range. With this configuration, a landing field that the eVTOL 10 can reach with the current remaining battery charge is set as the destination. Therefore, it is possible to restrict the occurrence of a situation where the eVTOL 10 in a state in which an abnormality has occurred cannot reach the destination.

According to the present embodiment, in the resetting mode, the flight-possible range is calculated according to the cruise-possible amount obtained by subtracting the landing consumption amount from the remaining battery charge. Therefore, it is possible to restrict the occurrence of a situation where the battery 31 does not have electric power for vertically landing the eVTOL 10 when the eVTOL 10 in a state in which an abnormality has occurred reaches above the destination.

According to the present embodiment, in the resetting mode, the flight-possible range is calculated based on at least one EPU 50 of the eVTOL 10 having an abnormality. With this configuration, even if the number or position of the at least one EPU 50 having an abnormality reduces the flight-possible range, as long as the destination is reset to be included in the flight-possible range, it is possible to restrict the occurrence of a situation where the eVTOL 10 cannot reach the destination.

According to the present embodiment, when an abnormality has occurred in the eVTOL 10 in the take-off preparation mode, the operating mode is changed to the take-off prohibition mode. Therefore, it is possible to restrict the occurrence of a situation where the eVTOL 10 in a state in which an abnormality has occurred takes off. In this way, it is possible to enhance safety by the take-off prohibition mode for the eVTOL 10 in which an abnormality has occurred during take-off preparation.

According to the present embodiment, at least a part of the processing to be performed in the normal mode is automatically performed by the flight control device 40. Therefore, it is possible to restrict the occurrence of an abnormality in the eVTOL 10 due to an artificial factor such as a steering error in the normal mode. Further, at least a part of the processing to be performed in the fail-safe mode is automatically performed by the flight control device 40. Therefore, in the fail-safe mode, it is possible to restrict the occurrence of a secondary abnormality due to an artificial factor in the eVTOL 10 in a state in which an abnormality has occurred.

In the eVTOL 10, there is an advantage that, since multiple EPUs 50 are mounted, even if one EPU 50 fails, the remaining EPU 50 can output a required thrust to continue the flight. On the other hand, with respect to the eVTOL 10, the flight control according to the position of the failed EPU 50, an operating state of each time, and the like is necessary. Therefore, a control mode that should correspond to the abnormality contents, such as a failure state of the EPU 50, is stored in the storage device 35 in advance, and automatic control of the eVTOL 10 is performed according to the control mode, whereby an artificial mistake of the pilot can be prevented.

According to the present embodiment, in the cruise mode, the diagnostic cycle of the abnormality diagnosis is set to the cruise cycle. In the eVTOL 10 that is cruising in the cruise mode, the flight state is likely to be stable. Therefore, even if an abnormality has occurred in the eVTOL 10, there is a low possibility that the flight state of the eVTOL 10 rapidly deteriorates due to the abnormality. Therefore, by setting the cruise cycle to a relatively long cycle, even if priority is given to reducing a processing load of the flight control device 40, the safety of the eVTOL 10 is unlikely to decrease.

According to the present embodiment, regarding the abnormality diagnosis, the cruise cycle, which is the diagnostic cycle in the cruise mode, is set to a cycle shorter than the on-the-land cycle in which the eVTOL 10 is on the ground. With this configuration, the abnormality diagnosis in the cruise mode is repeatedly performed in an appropriately short cycle called the cruise cycle. Therefore, it is possible to restrict a detection timing of the abnormality occurring in the eVTOL 10 during the cruise from being excessively delayed. Accordingly, it is possible to restrict an excessive increase in the processing load of the flight control device 40, and it is possible to restrict a situation where the cruise of the eVTOL 10 is continued over a long time without detecting the occurrence of an abnormality.

With this configuration, it is possible to avoid a situation where the abnormality diagnosis is repeatedly performed in an excessively short cycle for the eVTOL 10 on the ground.

Therefore, for example, it is possible to reduce the processing load of the flight control device 40 for the eVTOL 10 during take-off preparation.

In the eVTOL 10 during vertical take-off in the vertical take-off mode, the flight state is likely to be unstable. Therefore, when an abnormality occurs in the eVTOL 10 during vertical take-off, there is a concern that the flight state of the eVTOL 10 may rapidly deteriorate. Therefore, according to the present embodiment, regarding the abnormality diagnosis, the vertical take-off cycle, which is the diagnostic cycle in the vertical take-off mode, is set to a cycle shorter than the cruise cycle. With this configuration, it is possible to avoid a situation where the number of times of abnormality diagnosis is insufficient for the eVTOL 10 during vertical take-off. Therefore, even if an abnormality has occurred in the eVTOL 10 during vertical take-off, the abnormality can be detected quickly by the abnormality diagnosis. Accordingly, by the abnormality diagnosis in the vertical take-off mode, it is possible to restrict the flight state of the eVTOL 10 from deteriorating to the extent that it is difficult to recover due to the occurrence of the abnormality.

According to the present embodiment, when an abnormality has occurred in the eVTOL 10, the operating mode is set to the emergency landing mode according to which normal mode the operating mode is. Since vertical landing of the eVTOL 10 is performed in the emergency landing mode, a state in which the eVTOL 10 is in flight can be quickly terminated by the emergency landing mode. Therefore, the safety in the case where an abnormality has occurred in the eVTOL 10 can be enhanced by the emergency landing mode.

According to the present embodiment, the eVTOL 10 is an electric aircraft including the rotor 20 and the EPU 50. Therefore, it is easy to implement a configuration capable of landing the eVTOL 10 by the fail-safe mode.

Second Embodiment

In the first embodiment, in the emergency landing mode processing, the vertical landing of the eVTOL 10 is performed by the temporary ascending mode or the direct landing mode. In contrast, in a second embodiment, in emergency landing mode processing, vertical landing of the eVTOL 10 is performed by a forced landing mode. Configurations, operations, and effects not particularly described in the second embodiment are the same as those in the first embodiment. In the second embodiment, differences from the first embodiment described above will be mainly described.

Figure 10:
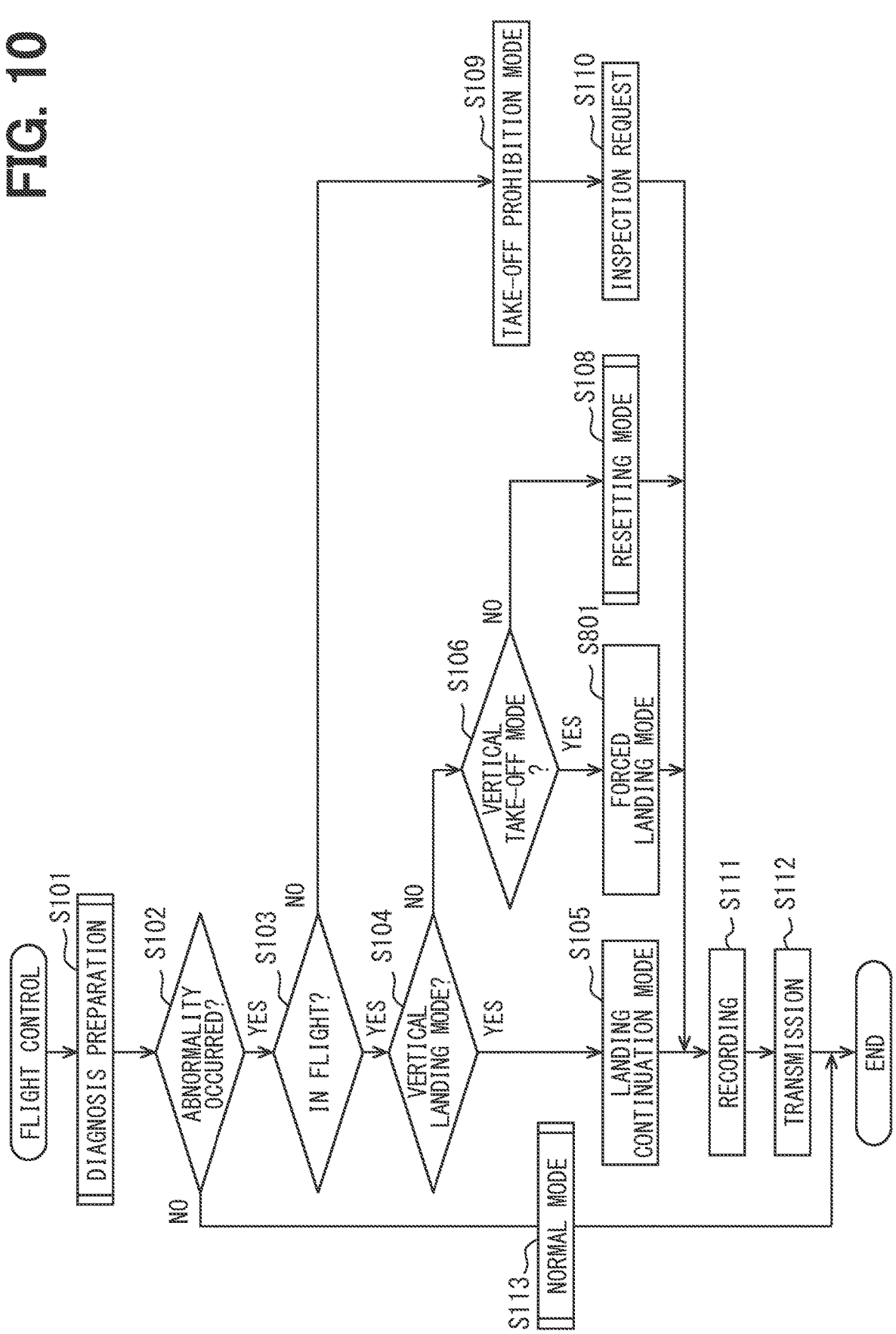
FIG. 10 is a flowchart illustrating a procedure of flight control processing according to a second embodiment.

Flight control processing of the present embodiment will be described with reference to the flowchart of FIG. 10. In steps S101 to S106 illustrated in FIG. 10, the flight control device 40 performs the same processing as in the first embodiment. When an abnormality occurs in the eVTOL 10 in flight and an operating mode is a vertical take-off mode in step S106, the flight control device 40 proceeds to step S801.

In step S801, the flight control device 40 performs forced landing mode processing. In the forced landing mode processing, the flight control device 40 changes the operating mode to the forced landing mode. The forced landing mode is a mode included in an emergency landing mode similarly to a direct landing mode and a temporary ascending mode. The forced landing mode is a mode for directly vertically landing the eVTOL 10 from the current altitude in a state where an abnormality has occurred in the eVTOL 10 during vertical take-off. The forced landing mode is a mode for the eVTOL 10 to vertically land by descending, without ascending, from the current altitude regardless of the altitude of the eVTOL 10. In the forced landing mode, the vertical landing of the eVTOL 10 is performed by driving at least two of at least four rotors 20 of the eVTOL 10 to rotate. The forced landing mode corresponds to an abnormal-landing mode.

In the forced landing mode processing, the flight control device 40 changes the operating mode to the forced landing mode regardless of the altitude of the eVTOL 10, and performs landing control in the forced landing mode. Even when the altitude of the eVTOL 10 is between the avoidance upper limit value Ha and the avoidance lower limit value Hb, the flight control device 40 performs vertical landing by causing the eVTOL 10 to descend without ascending. The function of the flight control device 40 executing the processing of step S801 corresponds to an abnormal-landing unit and a forced landing unit.

According to the present embodiment, when an abnormality has occurred in the eVTOL 10 during vertical take-off, the operating mode is changed to the forced landing mode regardless of the altitude of the eVTOL 10. With this configuration, since the eVTOL 10 is caused to directly vertically land regardless of the altitude, a time during which the eVTOL 10 in a state where an abnormality has occurred is in flight can be shortened as much as possible. Accordingly, a possibility of occurrence of a secondary abnormality in the eVTOL 10 in flight can be lowered by the forced landing mode.

The disclosure in the present description is not limited to the illustrated embodiments. The disclosure includes exemplary embodiments and modifications by those skilled in the art based on the exemplary embodiments. For example, the disclosure is not limited to the combination of components and elements described in the embodiments, and various modifications can be implemented. The disclosure can be implemented in various combinations. The disclosure can have an additional portion that can be added to the embodiments. The disclosure includes components and elements omitted from the embodiments. The disclosure includes the replacement or combination of components, elements between one embodiment and other embodiments. The disclosed technical scope is not limited to the description of the embodiments. The disclosed technical scope is indicated by the description of the claims, and should be construed to include all changes within the meaning and range equivalent to the description of the claims.

In the embodiments described above, multiple modes may be selectively used in the emergency landing mode. For example, the direct landing mode and the temporary ascending mode of the first embodiment and the forced landing mode of the second embodiment may be selectively used by the flight control device 40. For example, the temporary ascending mode and the forced landing mode may be selectively used according to abnormality contents. For example, the flight control device 40 determines whether driving of multiple rotors 20 is stopped due to occurrence of an abnormality, and changes the operating mode to the forced landing mode when multiple rotors 20 are stopped. On the other hand, when only one rotor 20 is stopped, the flight control device 40 changes the operating mode to the temporary ascending mode. Similarly to the direct landing mode, the flight control device 40 may change the operating mode to the forced landing mode in accordance with the altitude of the eVTOL 10.

In the first embodiment, when the altitude of the eVTOL 10 has not reached the avoidance lower limit value Hb, the operating mode may be changed to the temporary ascending mode instead of the direct landing mode. That is, when the altitude of the eVTOL 10 has not reached the avoidance upper limit value Ha, the flight control device 40 may change the operating mode to the temporary ascending mode regardless of whether the altitude of the eVTOL 10 has reached the avoidance lower limit value Hb.

In the embodiments described above, in the emergency landing mode, the altitude of the eVTOL 10 may change within a predetermined allowable range. For example, when the operating mode is the direct landing mode, as long as the eVTOL 10 can directly vertically land, the flight control device 40 may start descent of the eVTOL 10 after causing the eVTOL 10 to ascend within the allowable range. The direct vertical landing includes descending without ascending of the eVTOL 10 and descending after ascending within the allowable range of the eVTOL 10. The same applies to the forced landing mode. As the allowable range, for example, an altitude of several meters is set.

When the operating mode is the temporary ascending mode, as long as the eVTOL 10 can ascend temporarily, the flight control device 40 may start temporary ascent after causing the eVTOL 10 to descend within the allowable range. The temporary ascent includes ascending without descending of the eVTOL 10 and ascending after descending within the allowable range of the eVTOL 10.

In the embodiments described above, the take-off restriction mode such as the take-off prohibition mode may be any mode as long as the take-off of the eVTOL 10 is restricted therein. For example, in a case where the operating mode is the take-off restriction mode, the take-off prohibition flag may be released only when a specific operation is performed by a specific pilot with respect to the flight control device 40, for example, in a state where the abnormality of the eVTOL 10 is not eliminated. Regarding the eVTOL 10, the restriction on take-off includes prohibition of take-off. That is, the take-off restriction mode includes the take-off prohibition mode.

In the embodiments described above, the eVTOL 10 may not be the tiltrotor aircraft. That is, one rotor 20 does not need to serve as both the lift rotor and the cruise rotor. For example, one rotor 20 functions as only one of the lift rotor and the cruise rotor. With this configuration, in the eVTOL 10, the multiple rotors 20 include a lift rotor and a cruise rotor. In the eVTOL 10, the lift rotor is driven when the eVTOL 10 ascends, and the cruise rotor is driven when the eVTOL 10 advances in the front direction. The lift rotor may be referred to as a hover rotor.

Regarding the abnormality diagnosis, the flight control device 40 performs the abnormality diagnosis, taking an operating rotor among the lift rotor and the cruise motor as an object to be diagnosed. For example, in the cruise mode, the flight control device 40 includes the EPU 50 of the cruise motor as an object to be diagnosed, and does not include the EPU 50 of the lift motor as an object to be diagnosed. In the cruise mode, the diagnostic cycle for the lift rotor may be set to be longer than the diagnostic cycle for the cruise rotor.

In the embodiments described above, the vertical take-off and landing aircraft on which the flight control device 40 is mounted may be an electric-type vertical take-off and landing aircraft in which at least one rotor 20 is driven by at least one EPU 50. For example, one rotor 20 may be driven by multiple EPUs 50, or multiple rotors 20 may be driven by one EPU 50.

In the embodiments described above, the flight vehicle on which the flight control device 40 is mounted may not be an electric type as long as the flight vehicle is a vertical take-off and landing aircraft. The vertical take-off and landing aircraft may be equipped with an internal combustion engine such as an engine as a driving source for flying. The flight vehicle may not be a vertical take-off and landing aircraft as long as the flight vehicle is of an electric type. For example, the flight vehicle may be an electric aircraft capable of taking off and landing while gliding. Further, the flight vehicle may be a rotary-wing aircraft or a fixed-wing aircraft. The flight vehicle may be an unmanned flight vehicle with no person on board.

In the embodiments described above, the flight control device 40 is provided by a control system including at least one computer. The control system includes at least one processor that is hardware. When the processor is referred to as a hardware processor, the hardware processor can be implemented by (i), (ii), or (iii) to be described below.

(i) The hardware processor may be a hardware logic circuit. In this case, the computer is implemented by a digital circuit including many programmed logic units (gate circuits). The digital circuit may include a memory in which at least one of a program and data is stored. The computer may be implemented by an analog circuit. The computer may be implemented by a combination of the digital circuit and the analog circuit.

(ii) The hardware processor may be at least one processor core that executes a program stored in at least one memory. In this case, the computer is implemented by at least one memory and at least one processor core. The processor core is referred to as a CPU, for example. The memory is also referred to as a storage medium. The memory is a non-transitory and tangible storage medium non-temporarily storing "at least one of a program and data" readable by the processor.

(iii) The hardware processor may be a combination of (i) and (ii) described above. (i) and (ii) are provided on different chips or a common chip.

That is, at least one of means and functions provided by the flight control device 40 can be provided by hardware alone, software alone, or a combination thereof.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A flight control device for controlling a flight vehicle having an occupant compartment, the flight control device comprising:

at least one processor with a memory storing a flight control program, wherein the at least one processor with the memory is configured to cause the flight control device to:

operate the flight vehicle in accordance with an operating mode;

set the operating mode for controlling the flight vehicle to one of normal modes when no abnormality has occurred in the flight vehicle; and change the operating mode to one of fail-safe modes causing the flight vehicle to perform landing depending on a current one of the normal modes when the abnormality has occurred in the flight vehicle, wherein:

the at least one processor is configured to cause the flight control device to operate in:

an abnormal-landing mode causing the flight vehicle having the abnormality to perform vertical landing, a resetting mode resetting a flight route to enable the flight vehicle having the abnormality to perform landing at a destination, and a take-off restriction mode preventing the flight vehicle from performing take-off;

the at least one processor is configured to cause the flight control device to change the operating mode to the abnormal-landing mode, the resetting mode or the take-off restriction mode depending on the current one of the normal modes when the abnormality has occurred in the flight vehicle;

the normal modes include a take-off preparation mode causing the flight vehicle to perform take-off preparation;

the at least one processor is configured to cause the flight control device to:

change the operating mode to the take-off restriction mode in response to determining that (i) the operating mode is the take-off preparation mode and (ii) the abnormality has occurred in the flight vehicle;

output a notification of an inspection request for the flight vehicle based on the operating mode changed to the take-off restriction mode; and receive a command of releasing the take-off restriction from an external controller to release the take-off restriction when the flight vehicle is diagnosed by the external controller as normal based on the inspection request.

2. The flight control device according to claim 1, wherein:

the normal modes include a vertical take-off mode causing the flight vehicle to perform vertical take-off; and the at least one processor is configured to cause the flight control device to change the operating mode to the abnormal-landing mode when the operating mode is the vertical take-off mode and the abnormality has occurred in the flight vehicle.

3. The flight control device according to claim 2, wherein:

the abnormal-landing mode includes a forced landing mode causing the flight vehicle having the abnormality to directly perform vertical landing; and the at least one processor is configured to cause the flight control device to change the operating mode to the forced landing mode when the abnormality has occurred in the flight vehicle.

4. The flight control device according to claim 2, wherein:

the abnormal-landing mode includes a temporary ascending mode causing the flight vehicle having the abnormality to perform ascending and then perform vertical landing, the ascending includes ascending of the flight vehicle to a predetermined reference altitude or more, and a direct landing mode causing the flight vehicle having the abnormality to directly perform vertical landing; and the at least one processor is configured to cause the flight control device to:

change the operating mode from the vertical take-off mode to the direct landing mode when the flight vehicle has reached the reference altitude in the vertical take-off mode and the abnormality has occurred in the flight vehicle; and change the operating mode to the temporary ascending mode when the flight vehicle has not reached the reference altitude in the vertical take-off mode and the abnormality has occurred in the flight vehicle.

5. The flight control device according to claim 1, wherein:

the normal modes include a cruise mode causing the flight vehicle to perform cruising, and a hovering mode causing the flight vehicle to perform hovering; and the at least one processor is configured to cause the flight control device to change the operating mode to the resetting mode when the operating mode is the cruise mode or the hovering mode and the abnormality has occurred in the flight vehicle.

6. The flight control device according to claim 5, wherein:

the flight vehicle is provided with a power storage device that stores electric power for flying of the flight vehicle; and the at least one processor is configured to cause the flight control device to:

calculate a flight-possible range in which the flight vehicle is capable of flying with a remaining amount of the electric power remaining in the power storage device, and reset the destination to be included in the flight-possible range.

7. The flight control device according to claim 6, wherein the at least one processor is configured to cause the flight control device to calculate the flight-possible range as a range in which the flight vehicle is capable of flying with an actual remaining amount that is obtained by subtracting a landing consumption amount of electric power from the electric power remaining amount, the landing consumption amount being an amount of electric power required for vertical landing of the flight vehicle.

8. The flight control device according to claim 6, wherein:

the flight vehicle includes drive devices that drive to rotate respective rotors of the flight vehicle; and the at least one processor is configured to cause the flight control device to calculate the flight-possible range based on at least one of the drive devices when the abnormality has occurred in the at least one of the drive devices.

9. The flight control device according to claim 6, wherein:

the at least one processor is configured to cause the flight control device to:

search for a landing-possible place which is a place where the flight vehicle can land and is included in the flight-possible range; and set the landing-possible place as the destination when the landing-possible place is found.

10. The flight control device according to claim 5, wherein:

the fail-safe modes include a search flight mode causing the flight vehicle to perform flying while searching for a landing-possible place where the flight vehicle can land; and the at least one processor is configured to cause the flight control device to change the operating mode to the search flight mode when flight of the flight vehicle having the abnormality is possible.

11. The flight control device according to claim 5, wherein:

the at least one processor is configured to cause the flight control device to change the operating mode to the abnormal-landing mode to cause the flight vehicle to land on a place that is not the landing-possible place when flight of the flight vehicle having the abnormality is not possible.

12. The flight control device according to claim 5, wherein:

the normal modes include a vertical landing mode causing the flight vehicle to perform vertical landing;

the abnormal-landing mode includes a landing continuation mode causing the flight vehicle having the abnormality to continue vertical landing; and the at least one processor is configured to cause the flight control device to change the operating mode to the landing continuation mode when the operating mode is the vertical landing mode and the abnormality has occurred in the flight vehicle.

13. The flight control device according to claim 1, wherein:

the at least one processor is configured to cause the flight control device to:

execute abnormality diagnosis to determine whether the abnormality has occurred in the flight vehicle, under a predetermined diagnostic condition; and set the diagnostic condition based on the current one of the normal modes set as the operating mode.

14. The flight control device according to claim 1, wherein:

the flight vehicle is an electric aircraft and includes:

a rotor configured to rotate to drive the flight vehicle to perform flying, and a drive device that includes a motor configured to be driven to rotate the rotor; and the drive device is configured to drive the flight vehicle to perform flying.

15. A flight control device for controlling a flight vehicle having an occupant compartment, the flight control device comprising:

at least one processor with a memory storing a flight control program, wherein the at least one processor is configured to cause the flight control device to:

operate the flight vehicle in accordance with an operating mode;

set the operating mode for controlling the flight vehicle to one of normal modes when no abnormality has occurred in the flight vehicle; and change the operating mode to one of fail-safe modes causing the flight vehicle to perform landing depending on a current one of the normal modes when the abnormality has occurred in the flight vehicle, wherein:

the normal modes include:

a vertical take-off mode causing the flight vehicle to perform vertical take-off, a vertical landing mode causing the flight vehicle to perform vertical landing, a cruise mode causing the flight vehicle to perform cruising, a hovering mode causing the flight vehicle to perform hovering, and a take-off preparation mode causing the flight vehicle to perform take-off preparation;

the fail-safe modes include:

an abnormal-landing mode causing the flight vehicle having the abnormality to perform vertical landing, a resetting mode resetting a flight route to enable the flight vehicle having the abnormality to perform landing at a destination, and a take-off restriction mode preventing the flight vehicle from performing take-off, and a landing continuation mode causing the flight vehicle
having the abnormality to continue vertical landing;
the at least one processor is configured to cause the flight
control device to change the operating mode to the
abnormal-landing mode, the resetting mode, the take-
off restriction mode or the landing continuation mode
depending on the current one of the normal modes
when the abnormality has occurred in the flight vehicle;
the at least one processor is configured to cause the flight
control device to:
change the operating mode to the abnormal-landing
mode in response to determining that (i) the operat-
ing mode is the vertical take-off mode and (ii) the
abnormality has occurred in the flight vehicle;
change the operating mode to the landing continuation
mode in response to determining that (i) the operat-
ing mode is the vertical landing mode and (ii) the
abnormality has occurred in the flight vehicle;
change the operating mode to the resetting mode in
response to determining that (i) the operating mode
is the cruise mode or the hovering mode and (ii) the
abnormality has occurred in the flight vehicle;
change the operating mode to the take-off restriction
mode in response to determining that (i) the operat-
ing mode is the take-off preparation mode and (ii) the
abnormality has occurred in the flight vehicle;
output a notification of an inspection request for the
flight vehicle based on the operating mode changed
to the take-off restriction mode; and
receive a command of releasing the take-off restriction
from an external controller to release the take-off
restriction when the flight vehicle is diagnosed by the
external controller as normal based on the inspection
request,
the flight vehicle is provided with a power storage device
that stores electric power for flying of the flight vehicle;
and
the at least one processor is configured to cause the flight
control device to:
calculate a flight-possible range in which the flight
vehicle is capable of flying with a remaining amount
of the electric power remaining in the power storage
device,
search for a landing-possible place which is a place
where the flight vehicle can land and is included in
the flight-possible range, and
set the landing-possible place as the destination when
the landing-possible place is found.
16. A non-transitory computer readable medium storing a
flight control program for controlling a flight vehicle having
an occupant compartment, the program comprising instruc-
tions which, when executed by at least one processor, cause
the at least one processor to carry out:
operating the flight vehicle in accordance with an oper-
ating mode;
setting the operating mode for controlling the flight
vehicle to one of normal modes when no abnormality
has occurred in the flight vehicle; and
changing the operating mode to one of fail-safe modes
causing the flight vehicle to perform landing depending
on a current one of the normal modes when the abnor-
mality has occurred in the flight vehicle, wherein:
the fail-safe modes include
an abnormal-landing mode causing the flight vehicle
having the abnormality to perform vertical landing, a resetting mode resetting a flight route to enable the
flight vehicle having the abnormality to perform
landing at a destination, and
a take-off restriction mode preventing the flight vehicle
from performing take-off;
the changing includes changing the operating mode to the
abnormal-landing mode, the resetting mode or the
take-off restriction mode depending on the current one
of the normal modes when the abnormality has
occurred in the flight vehicle,
the normal modes include a take-off preparation mode
causing the flight vehicle to perform take-off prepara-
tion;
the changing includes:
changing the operating mode to the take-off restriction
mode in response to determining that (i) the operat-
ing mode is the take-off preparation mode and (ii) the
abnormality has occurred in the flight vehicle;
outputting a notification of an inspection request for the
flight vehicle based on the operating mode changed
to the take-off restriction mode; and
receiving a command of releasing the take-off restric-
tion from an external controller to release the take-
off restriction when the flight vehicle is diagnosed by
the external controller as normal based on the inspec-
tion request.
17. A non-transitory computer readable medium storing a
flight control program for controlling a flight vehicle having
an occupant compartment, the program comprising instruc-
tions which, when executed by at least one processor, cause
the at least one processor to carry out:
operating the flight vehicle in accordance with an oper-
ating mode;
setting the operating mode for controlling the flight
vehicle to one of normal modes when no abnormality
has occurred in the flight vehicle; and
changing the operating mode to one of fail-safe modes
causing the flight vehicle to perform landing depending
on a current one of the normal modes when the abnor-
mality has occurred in the flight vehicle, wherein:
the normal modes include
a vertical take-off mode causing the flight vehicle to
perform vertical take-off,
a vertical landing mode causing the flight vehicle to
perform vertical landing,
a cruise mode causing the flight vehicle to perform
cruising,
a hovering mode causing the flight vehicle to perform
hovering, and
a take-off preparation mode causing the flight vehicle to
perform take-off preparation;
the fail-safe modes include
an abnormal-landing mode causing the flight vehicle
having the abnormality to perform vertical landing,
a resetting mode resetting a flight route to enable the
flight vehicle having the abnormality to perform
landing at a destination,
a take-off restriction mode preventing the flight vehicle
from performing take-off, and
a landing continuation mode causing the flight vehicle
having the abnormality to continue vertical landing;
the changing includes changing the operating mode to the
abnormal-landing mode, the resetting mode, the take-
off restriction mode or the landing continuation mode
depending on the current one of the normal modes
when the abnormality has occurred in the flight vehicle;
the changing includes changing the operating mode to the abnormal-landing mode in response to determining that (i) the operating mode is the vertical take-off mode and (ii) the abnormality has occurred in the flight vehicle, changing the operating mode to the landing continuation mode when in response to determining that (i) the operating mode is the vertical landing mode and (ii) the abnormality has occurred in the flight vehicle, changing the operating mode to the resetting mode in response to determining that (i) the operating mode is the cruise mode or the hovering mode and (ii) the abnormality has occurred in the flight vehicle, changing the operating mode to the take-off restriction mode in response to determining that (i) the operating mode is the take-off preparation mode and (ii) the abnormality has occurred in the flight vehicle, outputting a notification of an inspection request for the flight vehicle based on the operating mode changed to the take-off restriction mode, receiving a command of releasing the take-off restriction from an external controller to release the take-off restriction when the flight vehicle is diagnosed by the external controller as normal based on the inspection request;

the flight vehicle is provided with a power storage device that stores electric power for flying of the flight vehicle; and the program further comprising instructions which, when executed by the at least one processor, cause the at least one processor to carry out:

calculating a flight-possible range in which the flight vehicle is capable of flying with a remaining amount of the electric power remaining in the power storage device;

searching for a landing-possible place which is a place where the flight vehicle can land and is included in the flight-possible range; and setting the landing-possible place as the destination when the landing-possible place is found.

* * * * *